US 9,758,207 B2

(12) United States Patent
Iizuka et al.

(10) Patent No.: US 9,758,207 B2
(45) Date of Patent: Sep. 12, 2017

(54) VEHICLE

(71) Applicant: Yamaha Hatsudoki Kabushiki Kaisha, Iwata-shi, Shizuoka (JP)

(72) Inventors: Toshio Iizuka, Shizuoka (JP); Yosuke Hirayama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/653,369

(22) PCT Filed: Dec. 20, 2013

(86) PCT No.: PCT/JP2013/084341
§ 371 (c)(1),
(2) Date: Jun. 18, 2015

(87) PCT Pub. No.: WO2014/098236
PCT Pub. Date: Jun. 26, 2014

(65) Prior Publication Data
US 2015/0307149 A1    Oct. 29, 2015

(30) Foreign Application Priority Data

Dec. 21, 2012  (JP) .................................. 2012-278878
Dec. 21, 2012  (JP) .................................. 2012-278879
Jul.  1, 2013   (JP) .................................. 2013-138481

(51) Int. Cl.
*B62K 5/08*        (2006.01)
*B62K 5/10*        (2013.01)
(Continued)

(52) U.S. Cl.
CPC ................. *B62K 5/10* (2013.01); *B62D 9/02* (2013.01); *B62K 5/027* (2013.01); *B62K 5/05* (2013.01);
(Continued)

(58) Field of Classification Search
CPC ... B62D 9/00; B62D 9/02; B62D 9/04; B62D 7/224; B60G 17/0162; B60G 17/08;
(Continued)

(56) References Cited

U.S. PATENT DOCUMENTS 2,990,215 A  *  6/1961  May .......................... B60J 5/103
                                                         16/248
4,088,199 A      5/1978  Trautwein
                         (Continued)

FOREIGN PATENT DOCUMENTS

CN          202414056 U     9/2012
DE    10 2010 052 716 A1    6/2011
                  (Continued)

OTHER PUBLICATIONS

Hirayama; "Vehicle"; U.S. Appl. No. 14/901,375, filed Dec. 28, 2015.
(Continued)

*Primary Examiner* — Barry Gooden, Jr.
(74) *Attorney, Agent, or Firm* — Keating and Bennett, LLP

(57) ABSTRACT

A vehicle includes a body frame, a left front wheel and a right front wheel, a link mechanism configured to be deformed as a vehicle body leans, and vehicle components disposed directly forward of the link mechanism in relation to a front-and-rear direction of the vehicle. The vehicle components are supported on the body frame via penetrating portions that extend from the body frame toward the front of the vehicle and penetrate the link mechanism.

12 Claims, 13 Drawing Sheets

(51) Int. Cl.
 *B62D 9/02* (2006.01)
 *B62K 19/38* (2006.01)
 *B62K 25/04* (2006.01)
 *B62K 5/05* (2013.01)
 *B62K 5/027* (2013.01)
 *B62K 5/00* (2013.01)

(52) U.S. Cl.
 CPC .............. *B62K 5/08* (2013.01); *B62K 19/38* (2013.01); *B62K 25/04* (2013.01); *B60G 2300/122* (2013.01); *B60G 2300/45* (2013.01); *B62K 2005/001* (2013.01)

(58) Field of Classification Search
 CPC ................ B60G 21/05; B60G 2204/82; B60G 2204/8302; B60G 2300/12; B60G 2300/122; B60G 2300/45; B60G 2800/012; B62K 5/05; B62K 5/027; B62K 5/08; B62K 5/10; B62K 21/18; B62K 21/20; B62K 2700/22
 See application file for complete search history.

(56) References Cited

U.S. PATENT DOCUMENTS

| | | | | |
|---|---|---|---|---|
| 4,351,410 | A | * | 9/1982 | Townsend ................ B62D 9/02 180/210 |
| 4,740,004 | A | * | 4/1988 | McMullen ............... B62K 5/05 280/124.103 |
| 6,367,824 | B1 | * | 4/2002 | Hayashi ................... B62K 5/05 280/124.103 |
| 6,817,617 | B2 | * | 11/2004 | Hayashi ................... B62K 5/05 280/124.1 |
| D547,242 | S | | 7/2007 | Lambri |
| 7,264,251 | B2 | * | 9/2007 | Marcacci ........... B60G 17/0152 280/124.103 |
| D598,328 | S | * | 8/2009 | Lambri ........................ D12/110 |
| 2005/0012291 | A1 | | 1/2005 | Bagnoli |
| 2005/0167174 | A1 | * | 8/2005 | Marcacci ........... B60G 17/0152 180/76 |
| 2005/0167217 | A1 | * | 8/2005 | Marcacci ............. B60G 15/063 188/300 |
| 2006/0151232 | A1 | * | 7/2006 | Marcacci ............. B60G 21/007 180/414 |
| 2010/0044977 | A1 | * | 2/2010 | Hughes ................ B60G 21/007 280/5.509 |
| 2010/0194068 | A1 | * | 8/2010 | Henderson ............... B62D 9/02 280/124.103 |
| 2013/0168944 | A1 | | 7/2013 | Bartolozzi et al. |
| 2014/0204598 | A1 | * | 7/2014 | Di Tanna ................. B60Q 1/12 362/460 |
| 2014/0375015 | A1 | | 12/2014 | Yu |
| 2015/0291241 | A1 | * | 10/2015 | Takano .................... B62K 5/05 280/5.509 |

FOREIGN PATENT DOCUMENTS

| | | |
|---|---|---|
| EP | 2 368 729 A1 | 9/2011 |
| JP | 11-334671 A | 12/1999 |
| JP | 2004-359232 A | 12/2004 |
| JP | 2005-313876 A | 11/2005 |
| JP | 2006-160254 A | 6/2006 |
| JP | 2010-184508 A | 8/2010 |
| JP | 2011-042224 A | 3/2011 |
| JP | 2011-195099 A | 10/2011 |
| NL | 1032554 C1 | 3/2008 |
| WO | 2012/007819 A1 | 1/2012 |

OTHER PUBLICATIONS

Official Communication issued in International Patent Application No. PCT/JP2013/084341, mailed on Apr. 1, 2014.
Piaggio, "Catalogo Parti Di Ricambio", NTRC000U01, MP3 300 ie LT Mod. ZAPM64102, 116 pages.
Official Communication issued in corresponding European Patent Application No. 13865581.6, mailed on Dec. 10, 2015.
Official Communication issued in corresponding European Patent Application No. 13 865 581.6, mailed on Dec. 18, 2015.

* cited by examiner

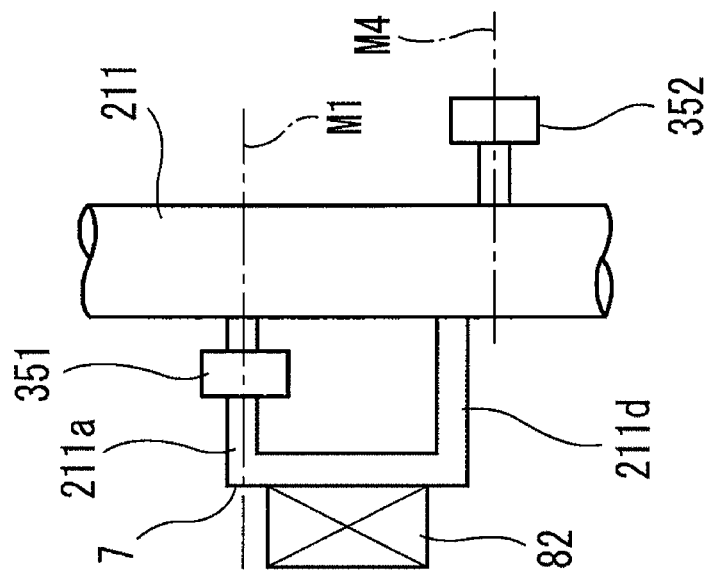
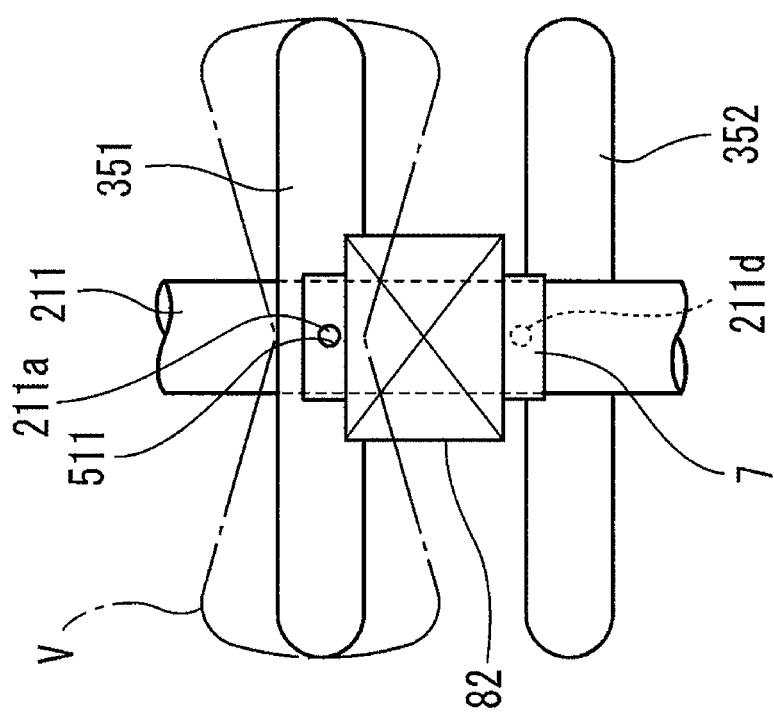
FIG. 9A
FIG. 9B

VEHICLE

BACKGROUND OF THE INVENTION

1. Field of the Invention

The present invention relates to a vehicle that includes a body frame that can lean and two front wheels.

2. Description of the Related Art

Vehicles including a body frame that can lean and two front wheels are known in Catalogo partidi ricambio, MP3 300 64102 ie LT Mod. ZAPM64102, Piaggio; U.S. Design Pat. No. 547,242 and the like. In the vehicle described in Catalogo partidi ricambio, MP3 300 64102 ie LT Mod. ZAPM64102, Piaggio on which a link mechanism is mounted, vehicle components such as a radiator, a headlamp and the like are disposed directly forward of the link mechanism.

In the vehicles described in Catalogo partidi ricambio, MP3 300 64102 ie LT Mod. ZAPM64102, Piaggio and U.S. Design Pat. No. 547,242, the link mechanism is disposed not between the right front wheel and the left front wheel but above the right front wheel and the left front wheel. This configuration prevents the enlargement of an empty space extending in a left-to-right direction of the vehicle.

In the vehicle described in Catalogo partidi ricambio, MP3 300 64102 ie LT Mod. ZAPM64102, Piaggio that includes the body frame that leans and two front wheels, a front portion of the vehicle is large. This is attributed to the fact that the vehicle includes two steerable front wheels, that is, the right front wheel and the left front wheel and the link mechanism that supports the right front wheel and the left front wheel so as to be displaced relative to the body frame in an up-and-down direction of the body frame. When the body frame leans with respect to a perpendicular direction, members that define the link mechanism move a large distance, and the right front wheel and the left front wheel are displaced a large distance relative to the body frame. This increases the size of an external vehicle component that is provided at the front portion of the vehicle so as to avoid interference with the link mechanism that moves a large distance and the right front wheel and the left front wheel that are displaced a large distance. Further, vehicle components such as a headlamp, turn signal lamps, a front cover, a radiator and the like are also disposed at the front portion of the vehicle. Because of this, in this type of vehicle, the front portion of the vehicle which is above the two front wheels tends to be enlarged.

FIG. 13 is a schematic view showing the body frame of the vehicle described in Catalogo partidi ricambio, MP3 300 64102 ie LT Mod. ZAPM64102, Piaggio. In the configuration described in Catalogo partidi ricambio, MP3 300 64102 ie LT Mod. ZAPM64102, Piaggio, the vehicle components like the body cover and the radiator are supported on the body frame 110 by a support member 100. This support member 100 includes an upper support member 101 that extends forward from above the link mechanism 105 so as to avoid interference with the link mechanism 105 and a lower support member 103 that extends forward and downward from the upper support member 101. The body cover is attached to the upper support member 101. The radiator is attached to the lower support member 103. As a result of this configuration, in the vehicle described in Catalogo partidi ricambio, MP3 300 64102 ie LT Mod. ZAPM64102, Piaggio that includes the body frame that leans and two front wheels, the front portion of the vehicle is large.

SUMMARY OF THE INVENTION

Preferred embodiments of the present invention provide a vehicle including a body frame that leans and two front wheels that prevents enlargement of the vehicle even though the vehicle includes vehicle components.

A preferred embodiment of the present invention provides a vehicle including a body frame; a left front wheel and a right front wheel that are disposed laterally when seen from a front of the vehicle and are configured to be steered; a left shock absorbing device that supports the left front wheel at a lower portion thereof and configured to absorb an upward displacement of the left front wheel in an up-and-down direction of the body frame; a right shock absorbing device that supports the right front wheel at a lower portion thereof and configured to absorb an upward displacement of the right front wheel in the up-and-down direction of the body frame; a link mechanism including a right side portion that supports an upper portion of the right shock absorbing device so as to turn about a right steering axis that extends in the up-and-down direction of the body frame, a left side portion that supports an upper portion of the left shock absorbing device so as to turn about a left turning axis that is parallel or substantially parallel to the right steering axis, and a cross portion that supports the right side portion at a right end portion thereof so as to turn about a right axis that extends in a front-and-rear direction of the body frame, that supports the left side portion at a left end portion thereof so as to turn about a left axis that is parallel or substantially parallel to the right axis, and that is supported on a link support portion of the body frame at a middle portion thereof so as to turn about a middle axis that is parallel or substantially parallel to the right axis and the left axis; and a vehicle component disposed forward of the body frame in relation to the front-and-rear direction of the body frame; wherein the cross portion includes a front cross portion located forward of the link support portion of the body frame; the link mechanism includes a through portion that defines a space that does not overlap the front cross portion when the cross portion turns relative to the body frame and that is located inward of a front movable outer edge defined by a locus when the cross portion turns relative to the body frame as seen along the direction of the middle axis; and the vehicle component is supported on the body frame via a component support portion disposed within the space defined by the through portion.

Conventionally vehicles that include a body frame that leans and two front wheels as described in Catalogo partidi ricambio, MP3 300 64102 ie LT Mod. ZAPM64102, Piaggio or U.S. Design Pat. No. 547,242 tend to have a large front portion. Those conventional vehicles that include the body frame that leans and two front wheels as described in Catalogo partidi ricambio, MP3 300 64102 ie LT Mod. ZAPM64102, Piaggio or U.S. Design Pat. No. 547,242 have been studied and analyzed in relation to a support construction of a vehicle component. The vehicle described in Catalogo partidi ricambio, MP3 300 64102 ie LT Mod. ZAPM64102, Piaggio or U.S. Design Pat. No. 547,242 includes a cross portion of the link mechanism and the vehicle component. As seen from the direction of the middle axis, the cross portion always is located inward of a movable outer edge defined by a locus of the cross portion when the cross portion is turned. A component support portion that supports the vehicle component is configured to move outward of the movable outer edge of the cross portion as seen from the direction of the middle axis in order to avoid interference of the vehicle component with the cross portion. Specifically, the vehicle described in Catalogo partidi ricambio, MP3 300 64102 ie LT Mod. ZAPM64102, Piaggio or U.S. Design Pat. No. 547,242 includes an upper stay that extends from the body frame to the front of the link mechanism by moving above the movable outer edge of the cross portion. Additionally, the vehicle includes a lower stay that extends from the body frame to the front of the link mechanism by moving below the movable outer edge of the cross portion. It has been discovered that the front portion of the vehicle is enlarged due to the upper stay and the lower stay being disposed above and below the movable outer edge of the cross portion. Further, it has also been discovered from the results of analysis that a long distance defined between the vehicle component and the body frame lengthens the upper stay and the lower stay. In addition to this, the upper stay and the lower stay are enlarged in order to ensure the rigidity with which the vehicle component is supported. The increase in size of the upper stay and the lower stay enlarges the front portion of the vehicle.

As a result of study and analysis, the inventors have discovered the technical idea that the component support portion should not move around (detour) the movable outer edge of the cross portion in place of the conventional technical idea that the component support portion moves around (detours) the movable outer edge of the cross portion. This technical idea was first discovered through a detailed analysis of the turning motion of the cross member relative to the body frame. The movable outer edge of the cross portion is large. This is attributed to the fact that the shape of the cross portion is configured to be large enough to bear a load that is exerted on the front wheels. This limits the possibility of making the movable outer edge of the cross portion small. Additionally, the cross portion is turnably supported on the body frame. In addition, the cross portion includes a front cross portion that is located forward of a link support portion of the body frame. Because of this, the inventors have discovered that avoiding interference with the front cross portion makes it difficult to enlarge the front portion of the vehicle even though the vehicle component is disposed at the front portion of the vehicle. Then, the inventors discovered the technical idea that the vehicle component should be supported inward of the large movable outer edge of the cross portion, that is, the technical idea that the vehicle component should not move around the movable outer edge of the cross portion. Additionally, the inventors have noticed that a through portion is easily located inward of the movable outer edge of the cross portion by making use of the original large shape of the cross portion that has conventionally been considered as a disadvantage when devising the shape of the cross portion. In addition, the inventors have discovered that it is possible to prevent the enlargement of the movable outer edge of the cross portion even though the through portion is provided in the link mechanism. Preferred embodiments of the present invention have been accomplished based on the knowledge and discoveries obtained through the above study and the analyses.

According to a preferred embodiment of the present invention, the cross portion includes a front cross portion located forward of the link support portion of the body frame. The link mechanism includes the through portion that does not overlap the front cross portion when the cross portion turns relative to the body frame and that is inward of the front movable outer edge defined by a locus when the cross portion turns relative to the body frame as seen from the direction of the middle axis. The vehicle component is supported on the body frame via the component support portion that is disposed within the space defined by the through portion.

Consequently, even though the vehicle component is mounted on the vehicle that includes the body frame that leans and two front wheels, it is possible to prevent the enlargement of the vehicle.

According to a preferred embodiment of the present invention, the through portion is preferably located inward of the outer edge of the front cross portion that is located forward of the link support portion as seen from the direction of the middle axis.

According to the configuration described above, since the through portion is located inward of the outer edge of the front cross portion, it is possible to prevent enlargement of the front movable outer edge of the front cross portion. Consequently, even though the vehicle component is mounted on the vehicle that includes the body frame that leans and two front wheels, it is possible to further prevent enlargement of the vehicle.

According to a preferred embodiment of the present invention, the through portion is preferably located closer to the middle axis than a left end portion and a right end portion of the front cross portion that is located forward of the link support portion.

A size of the through portion as seen from the direction of the middle axis is preferably smaller as the through portion is disposed closer to the middle axis. Because of this, according to the configuration described above, even though the vehicle component is mounted on the vehicle that includes the body frame that leans and two front wheels, it is possible to prevent further the enlargement of the vehicle.

According to a preferred embodiment of the present invention, the middle axis is preferably located within the space defined by the through portion as seen from the direction of the middle axis.

The middle axis neither moves nor turns with respect to the body frame even as the link mechanism operates. Because of this, according to the configuration described above, the through portion has a required minimum size. Consequently, even though the vehicle component is mounted on the vehicle that includes the body frame that leans and two front wheels, it is possible to further prevent enlargement of the vehicle.

According to a preferred embodiment of the present invention, the component support portion preferably defines a portion of a turning support portion that supports the front cross portion on the link support portion so as to turn.

According to the configuration described above, since the component support portion is a portion that supports the front cross portion, a separate component support portion does not have to be provided, and the vehicle component is supported with a simple configuration. Consequently, even though the vehicle component is mounted on the vehicle that includes the body frame that leans and two front wheels, it is possible to prevent further enlargement of the vehicle.

According to a preferred embodiment of the present invention, the through portion is preferably an elongated hole that includes an arc centered about the middle axis of the front cross portion.

According to the configuration described above, the through portion defines an ellipse that includes the arc centered about the middle axis that is the turning center of the cross portion relative to the body frame. This makes it possible to make the shape of the through portion small while avoiding interference of the space defined by the through portion with the component support portion. Consequently, even though the vehicle component is mounted on the vehicle that includes the body frame that leans and two front wheels, it is possible to prevent further enlargement of the vehicle.

According to a preferred embodiment of the present invention, the link mechanism preferably includes a front upper cross portion located forward of the link support portion and a front lower cross portion located forward of the link support portion, and the middle axis is located below the upper cross portion, and the through portion preferably includes an upper through portion defined by a lower edge of the front upper cross portion and a lower through portion that is defined by an upper edge of the front lower cross portion.

According to the configuration described above, a gap between the front upper cross portion and the front lower cross portion is used to provide the component support portion. This enhances the utilization efficiency of the space at the front portion of the vehicle. Consequently, even though the vehicle component is mounted on the vehicle that includes the body frame that leans and two front wheels, it is possible to prevent further enlargement of the vehicle.

According to a preferred embodiment of the present invention, the vehicle component is preferably supported by the link support portion of the body frame.

According to the configuration described above, the portion of the link mechanism that supports the portion of the link mechanism that supports the right front wheel, the left front wheel, the right shock absorbing device, and the left shock absorbing device is highly rigid. Because of this, by supporting the vehicle component with an element having high rigidity, the configuration that supports the vehicle component is simplified. Consequently, even though the vehicle component is mounted on the vehicle that includes the body frame that leans and two front wheels, it is possible to prevent further enlargement of the vehicle.

According to a preferred embodiment of the present invention, the vehicle preferably includes a plurality of through portions and a plurality of the component support portions.

According to the configuration described above, the vehicle component is preferably supported at a plurality of locations so as to be supported strongly and rigidly. The individual component support portions are preferably small so as to make it easy to avoid their interference with the link mechanism. Consequently, even though the vehicle component is mounted on the vehicle that includes the body frame that leans and the front wheels, it is possible to prevent further enlargement of the vehicle.

According to a preferred embodiment of the present invention, the vehicle component, when seen from the direction of the middle axis, is preferably supported on the body frame via a connecting portion that is not disposed in the space that is defined by the through portion, but is disposed outward of the front movable outer edge.

According to the configuration described above, the supporting rigidity with which the vehicle component is supported is easily ensured by the component support portion and the connecting portion. Consequently, even though the vehicle component is mounted on the vehicle that includes the body frame that leans and the two front wheels, it is possible to prevent further enlargement of the vehicle.

According to a preferred embodiment of the present invention, the vehicle support portion is preferably a portion of at least any one of the body frame, the vehicle component, and an attaching bracket with which the vehicle component is attached to the body frame.

According to the configuration described above, the component support portion is preferably defined by any one of the other members. Consequently, even though the vehicle component is mounted on the vehicle that includes the body frame that leans and two front wheels, it is possible to prevent further enlargement of the vehicle.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 9A and 9B are views of a link mechanism and a component support portion of a vehicle according to a third modified example of a preferred embodiment of the present invention.

DETAILED DESCRIPTION OF THE PREFERRED EMBODIMENTS

Figure 1:
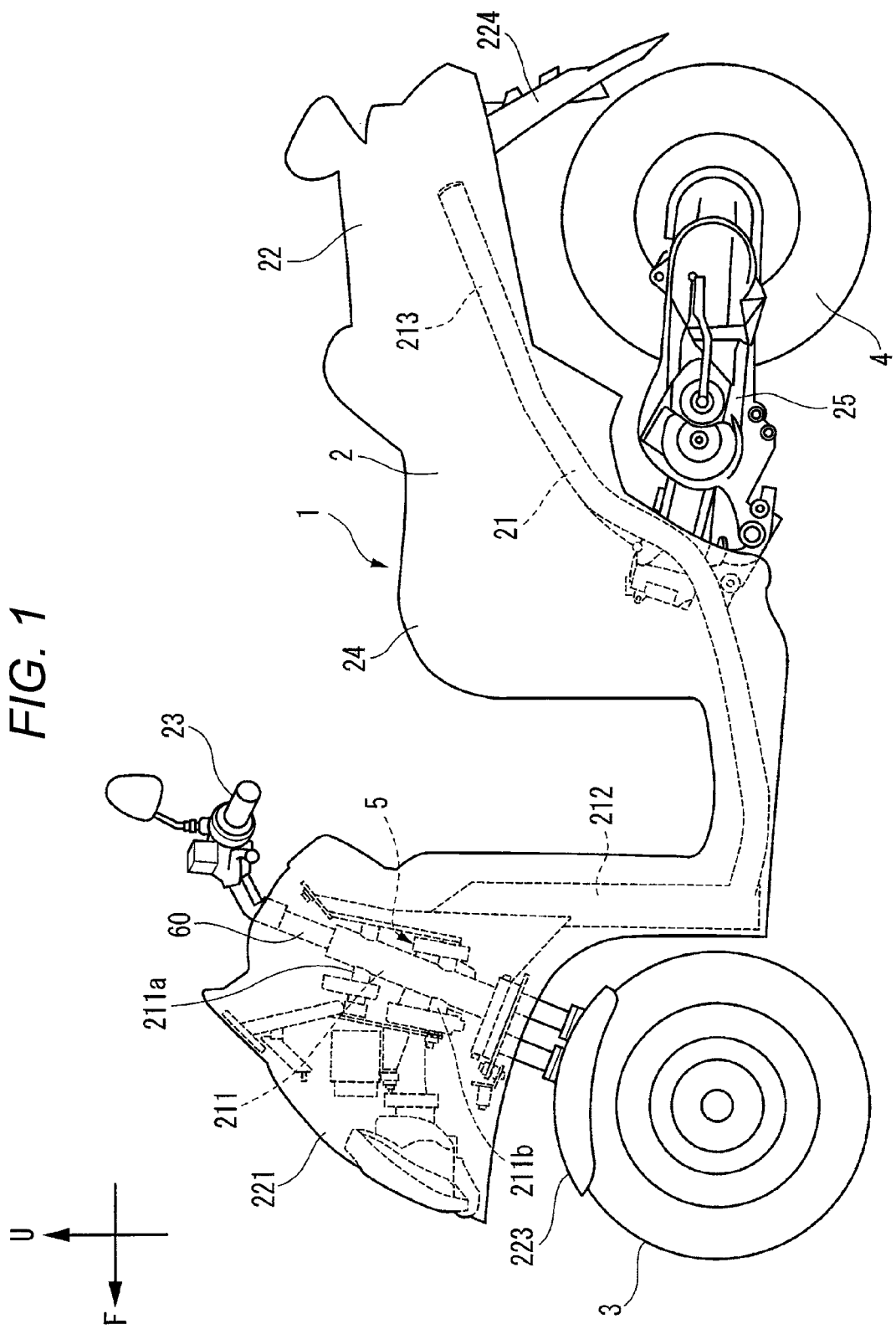
FIG. 1 is a left side view of a vehicle according to a preferred embodiment of the present invention.

Hereinafter, a vehicle 1 that is one type of vehicle according to a preferred embodiment of the present invention will be described by reference to the drawings. In the drawings, like reference numerals are given to like or corresponding portions and the description thereof will not be made repeatedly.

In the following description, an arrow F in the drawings denotes a forward direction of the vehicle 1. An arrow R in the drawings denotes a rightward direction of the vehicle 1. An arrow U denotes an upward direction. A center in a width direction or a transverse center of the vehicle indicates a central position in the width direction of the vehicle as seen from the front. A transversely lateral direction of the vehicle indicates a leftward or rightward direction as seen from the transverse center of the vehicle.

FIG. 1 is a schematic overall side view of the vehicle 1. In the following description, when front, rear, left, and right are referred to when indicating directions, they denote front, rear, left, and right as seen from a rider who rides on the vehicle 1.

The vehicle 1 includes a vehicle main body 2, front wheels 3, and a rear wheel 4. The vehicle main body 2 includes a vehicle body frame 21, a body cover 22, a handlebar 23, a seat 24, and a power unit 25.

The body frame 21 supports the power unit 25, the seat 24 and the like. The power unit 25 includes a power source such as an engine or an electric motor, a transmission and the like. In FIG. 1, the body frame 21 is shown by broken lines.

The body frame 21 includes a headstock 211, a front frame 212, and a rear frame 213. The headstock 211 is disposed at a front portion of the vehicle. A link mechanism 5 is disposed on the periphery of the headstock 211.

A steering shaft 60 is turnably inserted in the headstock 211. The steering shaft 60 extends in an up-and-down direction. A first penetrating portion 211a and a second penetrating portion 211b protrude from the headstock 211 toward the front so as to penetrate the link mechanism 5.

The handlebar 23 is mounted on an upper end of the steering shaft 60. The front frame 212 is inclined obliquely downward from a front end thereof to the rear. The rear frame 213 supports the seat 24 and a tail lamp.

The body frame 21 is covered by the body cover 22. The body cover 22 includes a front cover 221, front fenders 223, and a rear fender 224.

The front cover 221 is located forward of the seat 24. The front cover 221 covers the headstock 211 and the link mechanism 5.

The front fenders 223 are provided individually directly above the front wheels 3 that include a pair of left and right front wheels 3. The front fenders 223 are disposed directly below the front cover 221. The rear fender 224 is disposed directly above the rear wheel 4.

The front wheels 3 are disposed below the headstock 211 and the link mechanism 5. The front wheels 3 are disposed directly below the front cover 221.

Figure 2:
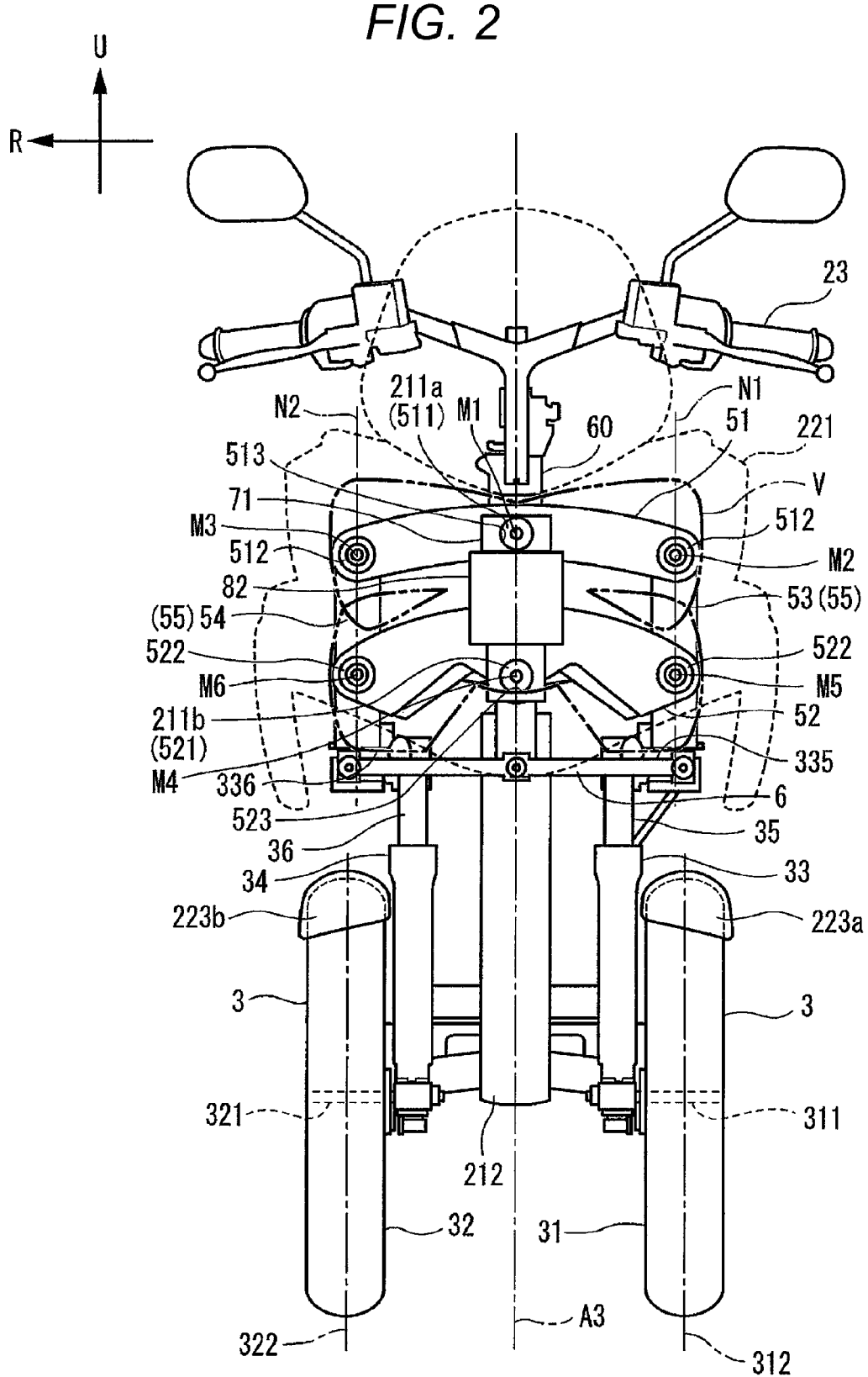
FIG. 2 is an overall front view of the vehicle shown in FIG. 1 with a body cover removed.
Figure 3:
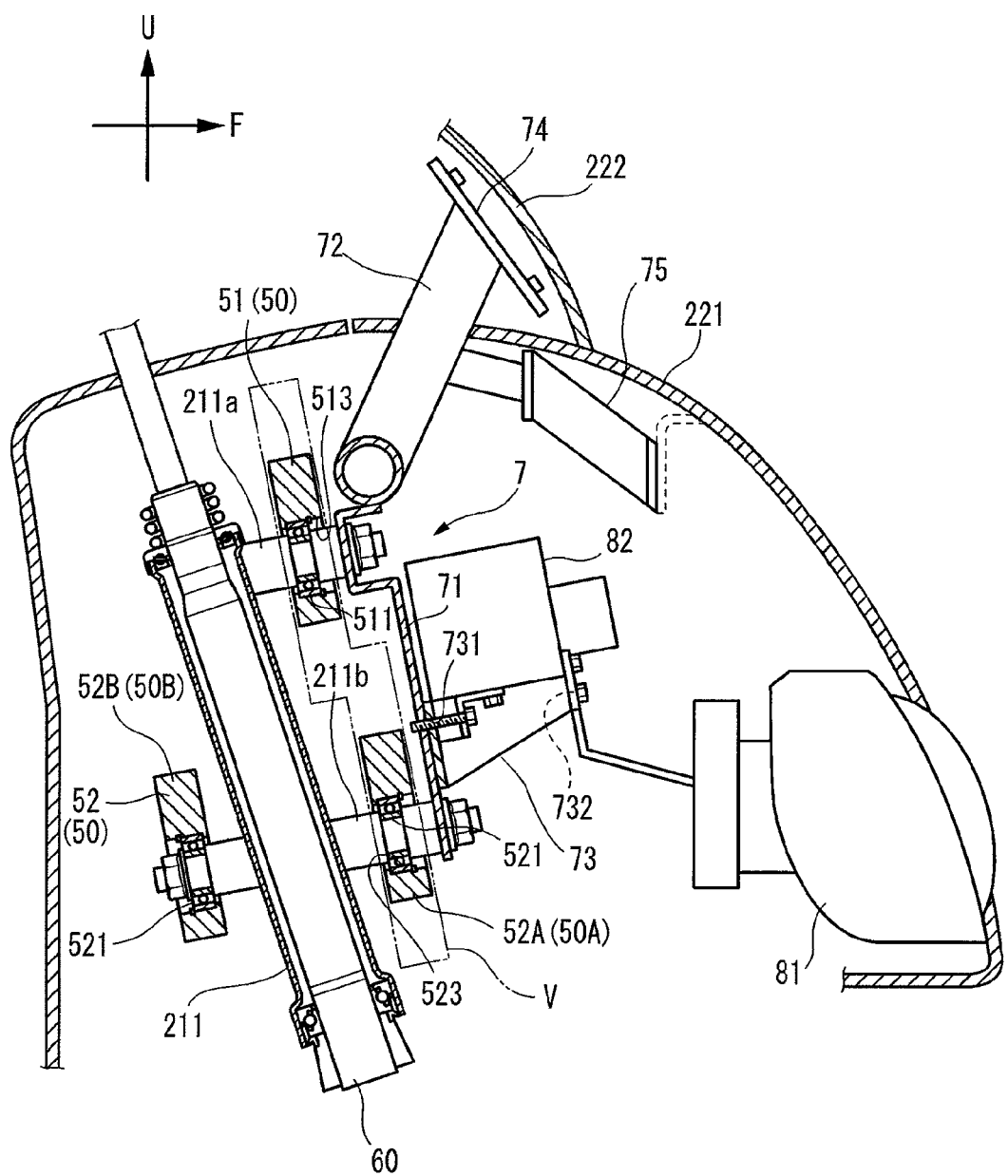
FIG. 3 is a sectional view of a front portion of the vehicle shown in FIG. 1 as seen from the right thereof.

FIG. 2 is an overall front view of the vehicle 1 with the body cover 22 removed. The vehicle 1 includes the handlebar 23, the steering shaft 60, the headstock 211, the pair of left and front wheels 3, and the link mechanism 5. The link mechanism 5 is disposed on the periphery of the headstock 211. The link mechanism 5 is connected to the pair of left and right front wheels 3, that is, a left front wheel 31 and a right front wheel 32. Additionally, the link mechanism 5 is turnably mounted on the headstock 211. As shown in FIGS. 2 and 3, the link mechanism 5 includes a cross portion 50 and a side portion 55. The cross portion 50 includes a front cross portion 50A located forward of the headstock 211 and a rear cross portion 50B located rearward of the headstock 211. An upper cross portion 51 includes a front upper cross portion 51A located forward of the headstock 211. A lower cross portion 52 includes a front lower cross portion 52A located forward of the headstock 211 and a rear lower cross portion 52B located rearward of the headstock 211. The front cross portion 50A includes the front upper cross portion 51A and the front lower cross portion 52A. The rear cross portion 50B includes a rear lower cross portion 52B. The side portion 55 includes a left side portion 53 and a right side portion 54.

The front wheels 3 include the right front wheel 31 and the left front wheel 32 that are steered. The left front wheel 31 is disposed farther leftward than a transverse center or middle portion of the vehicle. A first front fender 223a, which is one of the front fenders 223, is disposed directly above the left front wheel 31. The right front wheel 32 is disposed farther rightward than the transverse middle portion of the vehicle. A second front fender 223b, which is the other of the front fenders 223, is disposed directly above the right front wheel 32. The right front wheel 32 is symmetric with the left front wheel 31 with respect to the transverse middle portion of the vehicle.

Figure 6:
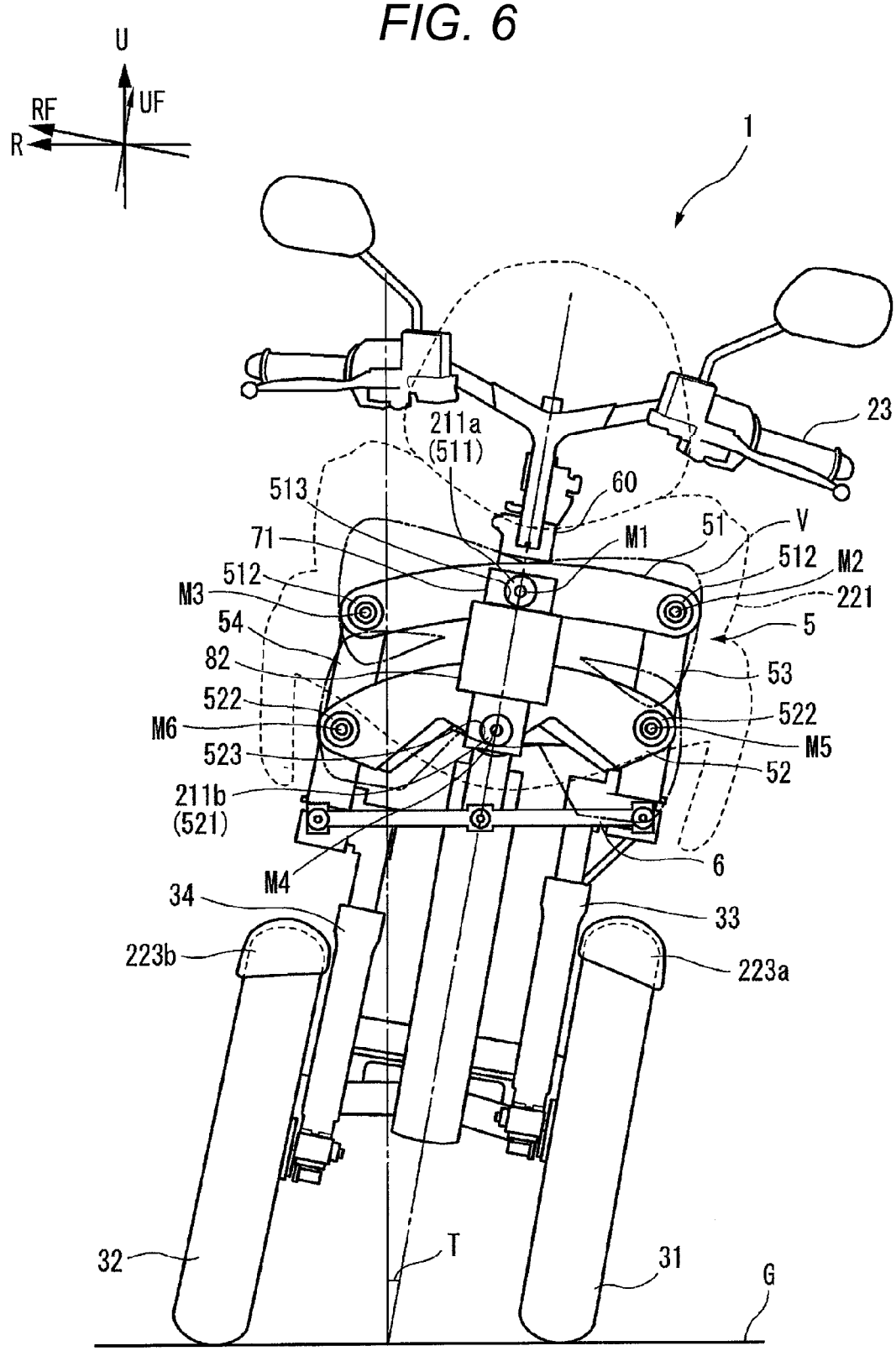
FIG. 6 is an overall front view showing a state in which the vehicle is caused to lean.

When referred to in this description, a "rightward direction RF of the vehicle body frame 21" denotes a rightward direction that intersects an axial direction of the headstock 211 perpendicularly or substantially perpendicularly in a front view of the vehicle 1. Additionally, when referred to, an upward direction UF of the body frame 21 denotes an upward direction of the body frame 21 when the vehicle 1 rests upright. For example, the upward direction of the body frame 21 coincides with an axial direction of the headstock 211 in the front view of the vehicle 1. In a state that the vehicle 1 rests in an upright state as shown in FIG. 2, the rightward direction RF of the vehicle body frame 21 coincides with a rightward direction R in the horizontal direction. Because of this, only the rightward direction R in the horizontal direction is shown in FIG. 2. In a state that the vehicle 1 leans relative to a road surface G as shown in FIG. 6, the rightward direction RF of the body frame 21 does not coincide with the rightward direction R in the horizontal direction, and the upward direction UF of the body frame 21 does not coincide with an upward direction U in the perpendicular direction.

The left front wheel 31 is connected to a left shock absorber 33. The left front wheel 31 is connected to a lower portion of the left shock absorber 33. The left front wheel 31 rotates about a rotational shaft 311. The rotational shaft 311 extends in a left-to-right direction of the body frame. The left front wheel 31 turns about a turning axis 312. The vehicle 1 changes its traveling direction as a result of the left front wheel 31 turning about the turning axis 312.

The right front wheel 32 is connected to a right shock absorber 34. The right front wheel 32 is connected to a lower portion of the right shock absorber 34. The right front wheel 32 rotates about a rotational shaft 321. The rotational shaft 321 extends in the left-and-right direction of the body frame 21. The right front wheel 32 turns about a turning axis 322. The vehicle 1 changes its traveling direction as a result of the right front wheel 32 turning about the turning axis 322.

The left shock absorber 33 absorbs an impact exerted on the left front wheel 31. The left shock absorber 33 is disposed below the link mechanism 5 in relation to the up-and-down direction of the body frame 21. The left shock absorber 33 is provided between the left side portion 53 (refer to FIG. 3), which will be described below, and the left front wheel 31. The left shock absorber 33 extends along a left steering axis N1 that is parallel or substantially parallel to axes of the steering shaft 60 and the headstock 211. The left shock absorber 33 is disposed to the left of the headstock 211 in relation to the left-and-right direction of the body frame 21. The left shock absorber 33 is disposed to the right of the left front wheel 31 in relation to the left-and-right direction of the body frame 21.

The right shock absorber 34 absorbs an impact exerted on the right front wheel 32. The right shock absorber 34 is disposed below the link mechanism 5 in relation to the up-and-down direction of the body frame 21. The right shock absorber 34 is provided between the right side portion 54 (refer to FIG. 3), which will be described below, and the right front wheel 32. The right shock absorber 34 extends along a right steering axis N2 that is parallel or substantially parallel to the axes of the steering shaft 60 and the headstock 211. The right shock absorber 34 is disposed to the right of the headstock 211 in relation to the left-and-right direction of the body frame 21. The right shock absorber 34 is disposed to the left of the right front wheel 32 in relation to the left-and-right direction of the body frame 21.

The left side portion 53 is disposed to the left of the headstock 211 in relation to the left-and-right direction of the body frame 21. The right side portion 54 is disposed to the right of the headstock 211 in relation to the left-and-right direction of the body frame 21. The left side portion 53 and the right side portion 54 are preferably a cylindrical or substantially cylindrical member. The left side portion 53 and the right side portion 54 are connected to the left front wheel 31 and the right front wheel 32, respectively, at lower portions thereof.

The left side portion 53 and the right side portion 54 extend in the up-and-down direction of the body frame 21 with the vehicle resting in the upright state. A first bracket 335 is provided at the lower portion of the left side portion 53, and the left shock absorber 33 is connected to the first bracket 335. The lower portion of the left side portion 53 supports the left shock absorber 33 so as to turn about the left steering axis N1.

A second bracket 336 is provided at the lower portion of the right side portion 54, and the right shock absorber 34 is connected to the second bracket 336. The lower portion of the right side portion 54 supports the right shock absorber 34 so as to turn about the right steering axis N2.

The upper cross portion 51 extends in the left-and-right direction of the body frame 21 as seen from the front of the vehicle. The upper cross portion 51 is provided farther forward to the front of the vehicle than the headstock 211. A first through hole 513 is provided in a middle portion of the upper cross portion 51 in the left-and-right direction of the body frame 21, and an upper left bearing 512 and an upper right bearing 512 are provided at both sides of the upper cross portion 51 in the left-and-right direction of the body frame 21. The first penetrating portion 211a that extends from the headstock 211 penetrates through the first through hole 513.

FIG. 3 is a right side view of the front portion of the vehicle. As shown in FIG. 3, an upper middle bearing 511 is provided between the first penetrating portion 211a and the first through hole 513. This allows the upper cross portion 51 to be supported so as to turn about an upper middle axis M1 relative to the headstock 211 by the first penetrating portion 211a and the upper middle bearing 511. The upper cross portion 51 turns about the upper middle axis M1 that defines the center of the upper middle bearing 511 relative to the headstock 211. The first through hole 513 includes the upper middle axis M1 of the upper cross portion 51.

The upper cross portion 51 is connected to an upper portion of the left side portion 53 and an upper portion of the right side portion 54 via the upper left bearing 512 and the upper right bearing 512, respectively. This allows the upper cross portion 51 to turn about an upper left axis M2 and an upper right axis M3 relative to the left side portion 53 and the right side portion 54, respectively. The upper middle axis M1 that defines a turning center of the upper middle bearing 511, the upper left axis M2 that defines a turning center of the upper left bearing 512, and the upper right axis M3 that defines a turning center of the upper right bearing 512 are arranged parallel or substantially parallel to one another.

Returning to FIG. 2, the lower cross portion 52 is provided below the upper cross portion 51. The lower cross portion 52 extends in the left-and-right direction when seen from the front of the vehicle. A length of the lower cross portion 52 in the left-and-right direction is equal or substantially equal to a length of the upper cross portion 51 in the left-and-right direction. The lower cross portion 52 is provided below the upper cross portion 51.

A second through hole 523 is provided in a middle portion of the lower cross portion 52 in the left-and-right direction of the body frame 21, and a lower left bearing 522 is provided to the left of the second through hole 523 while a lower right bearing 522 is provided to the right of the second through hole 523. The second penetrating portion 211b penetrates through the second through hole 523.

As shown in FIG. 3, a lower middle bearing 521 is provided between the second penetrating portion 211b and the second through hole 523. This allows the lower cross portion 52 to be supported so as to turn about a lower middle axis M4 relative to the headstock 211 by the second penetrating portion 211b and the lower middle bearing 521. The lower cross portion 52 turns about the lower middle axis M4 that defines the center of the lower middle bearing 521 relative to the headstock 211. The second through hole 523 includes the lower middle axis M4 of the lower cross portion 52.

The lower middle axis M4 that defines a turning center of the lower middle bearing 521, a lower left axis M5 that defines a turning center of the lower left bearing 522, and a lower right axis M6 that defines a turning center of the lower right bearing 522 are parallel or substantially parallel to one another. Additionally, the lower middle axis M4 is parallel or substantially parallel to the upper middle axis M1. In addition, with the vehicle 1 resting in the upright state, a position of the lower left bearing 522 in the left-and-right direction in relation to the body frame 21 is the same or substantially the same as a position of the upper left bearing 512 in the left-and-right direction in relation to the body frame 21. With the vehicle 1 resting in the upright state, a position of the lower right bearing 522 in the left-and-right direction in relation to the body frame 21 is the same or substantially the same as a position of the upper right bearing 512 in the left-and-right direction in relation to the body frame 21.

The lower cross portion 52 is connected to the lower portion of the left side portion 53 and the lower portion of the right side portion 54 via the lower left bearings 522 and the lower right bearings 522, respectively. This allows the lower cross portion 52 to turn about the left steering axis N1 and the right steering axis N2 relative to the left side portion 53 and the right side portion 54, respectively.

Thus, by being configured in the manner described above, the link mechanism 5 is deformed within a plane that contains the upper cross portion 51, the lower cross portion 52, the left side portion 53, and the right side portion 54. It is noted that the link mechanism 5 is mounted on the headstock 211. Because of this, even though the steering shaft 60 turns as the handlebar 23 is steered, the link mechanism 5 does not turn relative to the body frame 21.

The description continues by reference to FIG. 2. A tie-rod 6 transfers the steering motion of the handlebar 23 to the left front wheel 31 and the right front wheel 32. By doing so, the left front wheel 31 and the right front wheel 32 are steered by the handlebar 23. The tie-rod 6 is arranged forward of the headstock 211. The tie-rod 6 extends in the left-and-right direction. The tie-rod 6 is disposed below the lower cross portion 52 and above the left front wheel 31 and the right front wheel 32. The tie-rod 6 is connected to a lower portion of the steering shaft 60. When the steering shaft 60 is turned, the tie-rod 6 moves laterally to the left or right.

As shown in FIG. 2, the first bracket 335 is provided at the lower portion of the left side portion 53. The first bracket 335 is connected to the left shock absorber 33.

The first bracket 335 is configured to turn relative to the left side portion 53. The tie-rod 6 is also provided on the first bracket 335 so as to turn relative to the left side portion 53. A turning shaft on which the first bracket 335 turns relative to the left side portion 53 and a turning shaft on which the first bracket 335 turns relative to the tie-rod 6 are parallel or substantially parallel to the left steering axis N1 along which the left side portion 53 extends.

The second bracket 336 is provided at the lower portion of the right side portion 54. The second bracket 336 is connected to the right shock absorber 34. The second bracket 336 is configured to turn relative to the right side portion 54. The tie-rod 6 is also provided on the second bracket 336 so as to turn relative to the right side portion 54. A turning axis on which the second bracket 336 turns relative to the right side portion 54 and a turning axis on which the second bracket 336 turns relative to the tie-rod 6 are parallel or substantially parallel to the right steering axis N2 along which the right side portion 54 extends.

When the steering shaft 60 turns as a result of the handlebar 23 being steered, the tie-rod 6 moves laterally to the left or right. Then, the first bracket 335 turns about the turning shaft on which the first bracket 335 turns relative to the left side portion 53 as the tie-rod 6 moves. This moves a connecting portion 52b where the first bracket 335 connects to the left shock absorber 33 in the left-and-right direction, and the left front wheel 31 turns about the turning axis 312.

In this manner, the first bracket 335 transfers the steering motion of the handlebar 23 to the left front wheel 31. Similarly, the second bracket 336 transfers the steering motion of the handlebar 23 to the right front wheel 32.

As shown in FIG. 3, a headlamp 81 and a hydraulic unit 82 are provided in front of the link mechanism 5. Additionally, the front cover 221 and a windshield 222 are arranged to cover the headlamp 81 and the hydraulic unit 82. In the following description, the headlamp 81, the hydraulic unit 82, the front cover 221, and the windshield 222 are non-limiting examples of a vehicle component.

It is noted that the hydraulic unit 82 is a unit that is used in an ABS (Anti-lock Braking System). The hydraulic unit 82 includes a metallic casing, a flow path provided in the casing, a pump, and solenoid valves. The hydraulic unit 82 controls a brake system, not shown, by switching paths through which brake fluid flows by the solenoid valves.

The vehicle component is supported on the headstock 211 via an attaching bracket 7. In the following description, the headlamp 81 and the hydraulic unit 82 will be referred to as an example of a vehicle component, and a construction will be described in which the headlamp 81 and the hydraulic unit 82 are attached to the body frame 21.

Figure 4:
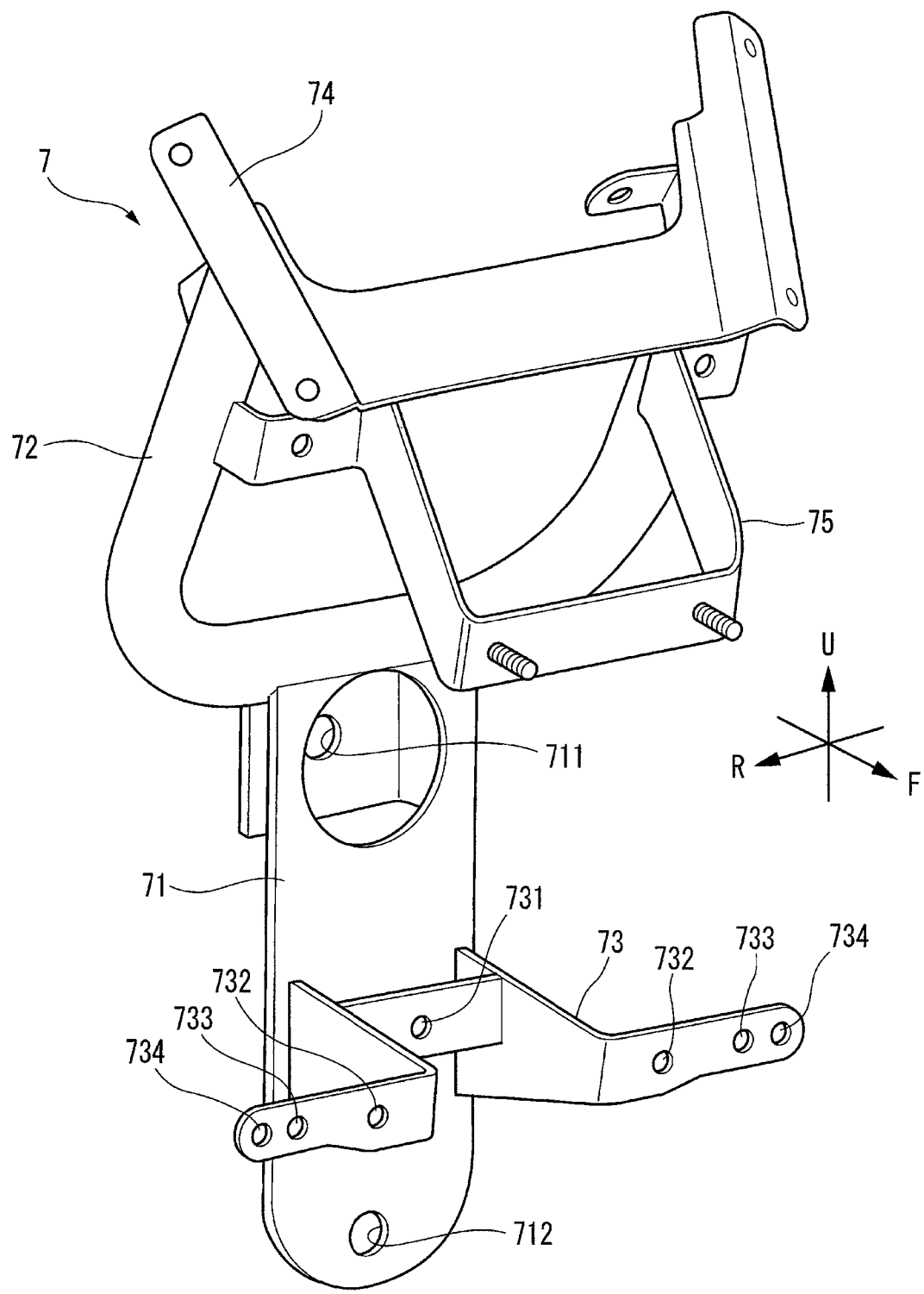
FIG. 4 is a perspective view of a support member.
Figure 5:
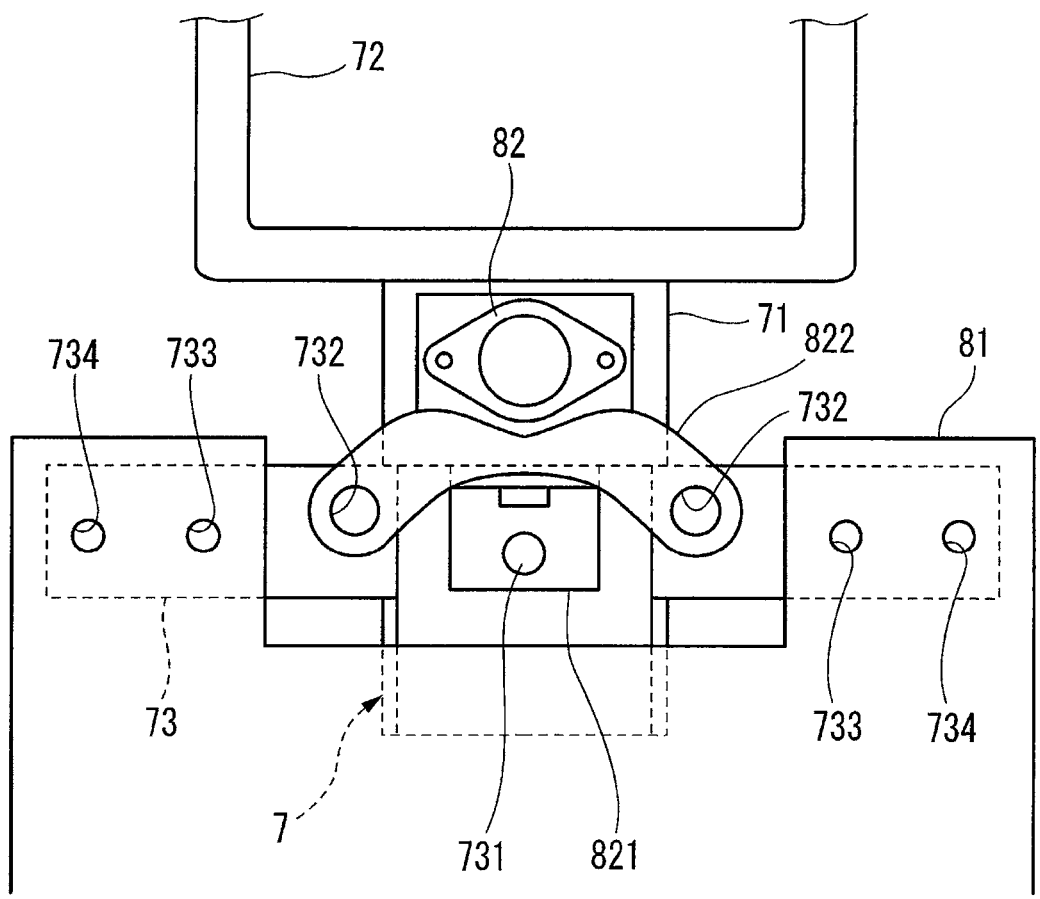
FIG. 5 is a front view showing an attaching bracket, a hydraulic unit, and a headlamp.

FIG. 4 is a perspective view of the attaching bracket 7. FIG. 5 is a front view showing the attaching bracket 7, a portion of the headlamp 81, and the hydraulic unit 82. As shown in FIGS. 4 and 5, the attaching bracket 7 includes an integral plate portion 71 and an extending portion 72 that extends obliquely from the plate portion 71. It is noted that the headlamp 81 and the hydraulic unit 82 overlap the link mechanism 5 at least partially when the vehicle is seen from the front thereof as shown in FIGS. 2 and 5.

As shown in FIG. 4, a first threaded hole 711 and a second threaded hole 712 are provided in the plate portion 71. A screw, for example, that is fixed to the first penetrating portion 211a extending from the headstock 211 is inserted through the first threaded hole 711. A screw, for example, that is fixed to the second penetrating portion 211b extending from the headstock 211 is inserted through the second threaded hole 712. The attaching bracket 7 is fixed to the headstock 211 by fixing the screws to the corresponding penetrating portions.

A first stay 73 is provided at a lower portion on a side of the plate portion 71 that faces the front of the vehicle. A third threaded hole 731 is provided in a transverse middle portion of the first stay 73. A pair of fourth threaded holes 732 are provided outward of the third threaded hole 731. A pair fifth threaded holes 733 are provided outward of the pair of fourth threaded holes 732. A pair of sixth threaded holes 734 are provided outward of the pair of fifth threaded holes 733.

As shown in FIG. 5, a screw, for example, is screwed through the third threaded hole 731 in the first stay 73 to fix an attaching piece 821 of the hydraulic unit 82 in place. Screws, for example, are screwed through the fourth threaded holes 732 in the first stay 73 to fix an attaching piece 822 of the hydraulic unit 82 in place. The hydraulic unit 82 is fixed to the attaching bracket 7 by screwing the screws through the corresponding threaded holes.

Screws, for example, are screwed through the fifth threaded holes 733 and the sixth threaded holes 734 in the first stay 73 to fix the headlamp 81 in place. The headlamp 81 is fixed to the attaching bracket 7 in this manner.

As shown in FIG. 4, a second stay 74 and a third stay 75 are provided at a distal end of the extending portion 72. As shown in FIG. 3, the windshield 222 is fixed to the second stay 74. The front cover 221 is fixed to the third stay 75.

The vehicle component is supported on the body frame 21 via the attaching bracket 7 in the manner described above. This attaching bracket 7 is fixed to the first penetrating portion 211a and the second penetrating portion 211b that protrude toward the front from the headstock 211 and penetrate through the link mechanism 5.

FIG. 6 is an overall front view of the vehicle 1 in which the vehicle body is caused to lean at an angle T in the left-and-right direction with respect to the perpendicular direction from the state shown in FIG. 2. When the link mechanism 5 is actuated, the vehicle 1 leans with respect to the perpendicular direction.

As this occurs, the upper cross portion 51 and the lower cross portion 52 are translated in the left-and-right direction while the direction in which they extend is kept parallel or substantially parallel to the road surface G. The upper cross portion 51 and the lower cross portion 52 turn about the upper left axis M2 and the lower left axis M5, respectively, relative to the left side portion 53. Additionally, the upper cross portion 51 and the lower cross portion 52 turn about the upper right axis M3 and the lower right axis M6, respectively, relative to the right side portion 54.

When the vehicle is seen from the front thereof, with the vehicle resting in the upright state, the upper cross portion 51, the lower cross portion 52, the left side portion 53, and the right side portion 54 define a rectangular or substantially rectangular shape and are deformed when the vehicle is caused to lean. Then, as the vehicle is caused to lean further, the upper cross portion 51, the lower cross portion 52, the left side portion 53, and the right side portion 54 are deformed into a parallel parallelogram. In the following description, when seen from a direction that is parallel or substantially parallel to the upper middle axis M1 of the upper cross portion 51 and the lower middle axis M4 of the lower cross portion 52, an area that includes the upper cross portion 51, the lower cross portion 52, the left side portion 53, and the right side portion 54 and that is inside the parallelogram defined by these four portions will be called an operating space of the link mechanism 5.

In the present preferred embodiment, the link mechanism 5 operates so that a left end of the upper cross portion 51 moves farther leftward than a left end of the lower cross portion 52. When the link mechanism 5 operates in this manner, the left shock absorber 33 and the right shock absorber 34 lean with respect to the perpendicular direction. When the vehicle 1 leans to the left with respect to the perpendicular direction in the manner described above, the state of the vehicle 1 changes from the state shown in FIG. 2 to the state shown in FIG. 5.

The vehicle 1 according to the present preferred embodiment is turned by causing the vehicle body to lean to the left or right while the vehicle 1 is running. Additionally, the directions of the left front wheel 31 and the right front wheel 32 are also changed by operating the handlebar 23.

As shown in FIG. 3, in the present preferred embodiment, the upper cross portion 51 of the link mechanism 5 is located forward of the headstock 211 of the body frame 21. Here, an area that is surrounded by an outer edge of a range where the upper cross portion 51 and the front lower cross portion 52A that are located forward of the headstock 211 move relative to the body frame 21 when the vehicle is caused to lean at a largest-possible angle to the left or right is called a front movable outer edge V (refer to FIGS. 2, 3, and 6).

As shown in FIG. 2, the link mechanism 5 includes a first through hole 513 that defines and functions as the through portion defining a space that does not overlap the upper cross portion 51 that is located forward of the headstock 211 when the upper cross portion 51 turns relative to the body frame 21. The space defined by this first through hole 513 is provided within the front movable outer edge V as seen from the direction of the upper middle axis M1.

The first penetrating portion 211a (an example of a component support portion) extends from the headstock 211 toward the front into this space defined by the first through hole 513. The headlamp 81, the hydraulic unit 82, the front cover 221 and the like are fixed to the attaching bracket 7 that is fixed to the first penetrating portion 211a. In particular, the vehicle component is supported on the body frame 21 via the first penetrating portion 211a disposed within the space defined by the first through hole 513.

Further, as shown in FIG. 2, the link mechanism 5 includes a second through hole 523 which defines and functions as the through portion defining a space that does not overlap the front lower cross portion 51 that is located forward of the headstock 211 when the front lower cross portion 52A turns relative to the body frame 21. The space defined by this second through hole 523 is provided within the front movable outer edge V as seen from the direction of the lower middle axis M4.

The second penetrating portion 211b (an example of a component support portion) extends from the headstock 211 toward the front into this space defined by the second through hole 523. The headlamp 81, the hydraulic unit 82, the front cover 221 and the like are fixed to the attaching bracket 7 that is fixed to the second penetrating portion 211b. In particular, the vehicle component is supported on the body frame 21 via the second penetrating portion 211b that is disposed within the space defined by the second through hole 523.

The vehicle 1 according to the present preferred embodiment described above includes the body frame 21; the left front wheel 31 and the right front wheel 32 that are disposed in the left and right direction as seen from the front of the vehicle and configured to be steered; the left shock absorber 33 that supports the left front wheel 31 at the lower portion thereof and configured to absorb the upward displacement of the left front wheel 31 in the up-and-down direction of the body frame 1; the right shock absorber 34 that supports the right front wheel 32 at the lower portion thereof and configured to absorb the upward displacement of the right front wheel 32 in the up-and-down direction of the body frame 21; the link mechanism 5; and the vehicle components such as the headlamp 81, the hydraulic unit 82, the front cover 221, the windshield 222 and the like that are disposed forward of the link mechanism 5.

The link mechanism 5 includes the right side portion 54 that supports the upper portion of the right shock absorber 34 so as to turn about the right steering axis N2 that extends in the up-and-down direction of the body frame 21; the left side portion 53 that supports the upper portion of the left shock absorber 33 so as to turn about the left steering axis N1 that is parallel or substantially parallel to the right steering axis N2; and the plurality of cross portions (the upper cross portion 51 and the lower cross portion 52) that support the right side portion 54 at the right end portions thereof so as to turn about the right axes (the upper right axis M3 and the lower right axis M6) that extend in the front-and-rear direction of the body frame 21, that support the left side portion 53 at the left end portions thereof so as to turn about the left axes (the upper left axis M2 and the lower left axis M5) that are parallel or substantially parallel to the right axes M3, M6, and that are supported on the headstock 211 (an example of a link support portion) that defines a portion of the body frame 21 at the middle portions thereof so as to turn about the middle axes M1, M4 that are parallel or substantially parallel to the right axes M3, M6 and the left axes M2, M5.

The upper cross portion 51 is located forward of the headstock 211 of the body frame 21. The link mechanism 5 includes a through portion that is provided in the front movable outer edge V relative to the body frame 21 of the front cross portion 50A (the upper cross portion 51 and the front lower cross portion 52A) that is located forward of the body frame 21 as seen from the direction of the upper middle axis M1 and that includes the first through hole 513 that defines the space that does not overlap the front cross portion 50A that is located forward of the body frame 21 when the front cross portion 50A turns relative to the body frame 21.

The vehicle components such as the headlamp 81, the hydraulic unit 82, the front cover 221 and the like are supported on the body frame 21 via the first penetrating portion 211a (an example of a component support portion) that is disposed within the space defined by the first through hole 513.

Additionally, the front lower cross portion 52A that defines at least a portion of the cross portion 50 is located forward of the headstock 211. The link mechanism 5 includes a through portion provided in the front movable outer edge V relative to the body frame 21 of the front cross portion 50A that is located forward of the body frame 21 as seen from the direction of the lower middle axis M4 and that includes the second through hole 523 that defines the space that does not overlap the front cross portion 50A that is located forward of the body frame 21 when the front cross portion 50A turns relative to the body frame 21.

The vehicle components such as the headlamp 81, the hydraulic unit 82, the front cover 221 and the like are supported on the body frame 21 via the second penetrating portion 211b (an example of a component support portion) that is disposed within the space defined by the second through hole 523.

The inventors studied the provision of a vehicle that supports a vehicle component disposed forward of a link mechanism in an ensured manner without enlarging a front portion of the vehicle.

Then, the inventors studied a configuration of a support construction to support a vehicle component that is compact in size. It is preferable to support a vehicle component by a body frame in order to support the vehicle component in a highly rigid manner. When attempting to dispose the vehicle component directly forward of the link mechanism, the support construction to support the vehicle component needs to be disposed in a position where the support construction does not interfere with the link mechanism even though the link mechanism operates.

In the vehicle described in U.S. Design Pat. No. 547,242, the component support portion that supports the vehicle component moves around the movable outer edge of the cross portion when the cross portion is turned through the largest possible angle as seen from the direction of the middle axis in order to avoid interference with the link mechanism. Specifically, the vehicle of U.S. Design Pat. No. 547,242 includes the upper stay that extends from the body frame toward the front of the link mechanism by moving above the movable outer edge of the link mechanism and the lower stay that extends from the body frame toward the front of the link mechanism by moving below the movable outer edge. The space where to dispose the upper stay is ensured above the movable outer edge and the space where to dispose the lower stay is ensured below the movable outer edge, and therefore, the front portion of the vehicle is enlarged.

Additionally, in the vehicle of U.S. Design Pat. No. 547,242, the component support portion moves around the movable outer edge of the link mechanism to connect together the body frame that is located behind the link mechanism and the vehicle component that is located forward of the link mechanism. Because of this, the component support portion is made of a highly rigid member, and the side of the component support portion itself becomes large.

In the vehicle of U.S. Design Pat. No. 547,242, the front portion of the vehicle tends to be enlarged for those reasons.

Incidentally, the inventor paid attention to the configuration in which the upper cross portion 51 and the lower cross portion 52 of the link mechanism 5 are made of members that are thick in the up-and-down direction of the body frame 21 because the upper cross portion 51 and the lower cross portion 52 bear the loads exerted on the front wheels 31, 32.

As shown in FIG. 3, when vertical sections taken along the axis of the steering shaft 60 are seen from the left-and-right direction of the body frame 21, the upper cross portion 51 and the lower cross portion 52 are longer in the up-and-down direction than in the front-and-rear direction of the body frame 21. Additionally, as shown in FIG. 3, when vertical sections taken along the left steering axis N1 are seen from the left-and-right direction of the body frame 21, the upper cross portion 51 and the lower cross portion 52 are longer in the up-and-down direction than in the front-and-rear direction of the body frame 21. In addition, when vertical sections taken along the right steering axis N2 are seen from the left-and-right direction of the body frame 21, the upper cross portion 51 and the lower cross portion 52 are longer in the up-and-down direction than in the front-and-rear direction of the body frame 21.

In this manner, since the upper cross portion 51 and the lower cross portion 52 are made of thick members, a space is provided between the upper cross portion 51 and the lower cross portion 52 so that the link mechanism 5 operates even when the vehicle 1 leans relative to the road surface G. In addition, since a recess portion, a hole portion or the like is able to be provided in the thick member, it is possible to define a space that does not overlap the upper cross portion 51 and the lower cross portion 52 even within the front movable outer edge V as seen from the direction of the middle axis by devising the shape of the upper cross portion 51.

Then, the inventor discovered that when a through portion that defines a space that the front cross portion 50A located forward of the headstock 211 does not overlap when the front cross portion 50A turns is provided in the cross portion 50 in the space defined between the upper cross portion 51 and the lower cross portion 52 or in a position that overlaps the upper cross portion 51 or the lower cross portion 52 as seen from the direction of the upper middle axis M1, the component support portion that supports the vehicle component is able to be provided in the space.

In the present preferred embodiment, the first through hole 513 is provided in the upper cross portion 51 as the through portion, and the first penetrating portion 211a as a component support portion is disposed in the space defined by the first through hole 513, such that the vehicle component is supported on the body frame 21 via the first penetrating portion 211a. In the present preferred embodiment, the second through hole 523 is provided in the front lower cross portion 52A as the through portion, and the second penetrating portion 211b as a component support portion is disposed in the space defined by the second through hole 523, such that the vehicle component is supported on the body frame 21 via the second penetrating portion 211b.

The first through hole 513 defines the space that does not overlap the upper cross portion 51, and therefore, the first penetrating portion 211a that is disposed within the space does not interfere with the upper cross portion 51 when the upper cross portion 51 turns. Additionally, the first penetrating portion 211a is configured to connect the body frame 21 and the vehicle component in a rectilinear manner. This makes it possible to make the component support portion that supports the vehicle component more compact in size than in the configuration of the vehicle of U.S. Design Pat. No. 547,242 in which the component support portion is provided so as to move around the outside of the movable outer edge. Additionally, according to the present preferred embodiment, since the vehicle component is supported in a position located near the body frame 21, the rigidity required of the component support portion such as the first penetrating portion 211a is made smaller than in the configuration of the vehicle of U.S. Design Pat. No. 547,242 in which the vehicle component is supported in a position located far from the vehicle body. This makes the component support portion itself smaller in size than the component support portion of the vehicle of U.S. Design Pat. No. 547,242.

Similarly, the second through hole 523 defines the space that does not overlap the front lower cross portion 52A, and therefore, the second penetrating portion 211b that is disposed within the space does not interfere with the front lower cross portion 52A when the front lower cross portion 52A turns. Additionally, the second penetrating portion 211b is configured to connect the body frame 21 and the vehicle component in a rectilinear manner. This makes it possible to make the component support portion that supports the vehicle component more compact in size than in the configuration of the vehicle of U.S. Design Pat. No. 547,242 in which the component support portion is provided so as to move around the outside of the movable outer edge. Additionally, according to the present preferred embodiment, since the vehicle component is supported near the body frame 21, the rigidity required of the component support portion such as the first penetrating portion 211a is made smaller than in the configuration of the vehicle of U.S. Design Pat. No. 547,242 in which the vehicle component is supported far from the vehicle body. This makes the component support portion itself smaller in size than the component support portion of the vehicle of U.S. Design Pat. No. 547,242.

According to the present preferred embodiment, for these reasons, the vehicle 1 supports the vehicle component disposed in front of the link mechanism 5 in an ensured manner without enlarging the front portion of the vehicle while avoiding interference with the link mechanism 5.

According to the vehicle 1 of the present preferred embodiment, the first through hole 513 is located inward of the outer edge of the upper cross portion 51 that is located forward of the headstock 211 as seen from the direction of the upper middle axis M1.

According to the present preferred embodiment, the first through hole 513 and the upper cross portion 51 overlap each other as seen from the direction of the upper middle axis M1. This makes it easy to make the construction that supports the vehicle component compact including the component support portion that is disposed in the space defined by the first through hole 513 as seen from the direction of the upper middle axis M1.

According to the vehicle of the present preferred embodiment, the first penetrating portion 211a is located in the middle of the upper cross portion 51 in relation to the left-and-right direction of the body frame 21. In particular, the first penetrating portion 211a is located closer to the upper middle axis M1 than the left end portion and the right end portion of the upper cross portion 51 that is located forward of the headstock 211.

According to the vehicle of the present preferred embodiment, the upper middle axis M1 is located within the space defined by the first through hole 513 as seen from the direction of the upper middle axis M1.

The upper cross portion 51 turns about the upper middle axis M1. The first penetrating portion 211a extends from the headstock 211 to penetrate the upper cross portion 51, and protrudes therefrom toward the front. Because of this, the first through hole 513 that defines the space within which the first penetrating portion 211a is disposed is small since the first penetrating portion 211a is disposed closer to the upper middle axis M1 as in the present preferred embodiment. Additionally, when the upper middle axis M1 is positioned in the space that is defined by the first through hole 513, the first penetrating portion 211a does not interfere with the upper cross portion 51.

According to the vehicle of the present preferred embodiment, the first penetrating portion 211a is a portion where the attaching bracket 7 that supports the vehicle component is attached and a portion where the upper cross portion 51 is supported so as to turn. In particular, the first penetrating portion 211a that is the component support portion is configured as a portion of a turning support portion that supports the upper cross portion 51 on the headstock 211 so as to turn relative thereto. Specifically, in the present preferred embodiment, the first penetrating portion 211a and the upper middle bearing 511 that is fitted on the first penetrating portion 211a define the portion where the upper cross portion 51 is supported so as to turn. The first penetrating portion 211a and an inner ring of the upper middle bearing 511 that is fitted on the first penetrating portion 211a define the portion where the attaching bracket 7 is attached.

According to the present preferred embodiment, the vehicle that includes the two front wheels 31, 32 and the link mechanism 5 includes the turning support portion that supports the upper cross portion 51 defining a portion of the link mechanism 5 so as to turn. The vehicle component is mounted on the vehicle while being supported with a simple configuration because the component support portion that supports the vehicle component includes the turning support portion.

According to the vehicle of the present preferred embodiment, the vehicle component is supported on the headstock 211 of the body frame 21.

Impacts inputted into the front wheels 31, 32 are transferred to the link mechanism 5. Due to this, the headstock 211 that supports the link mechanism 5 is highly rigid. Since the vehicle component is supported on the headstock 211 that is highly rigid, the supporting rigidity of the vehicle component is high.

According to the vehicle of the present preferred embodiment, the attaching bracket 7 that supports the vehicle component is supported on the headstock 211 via the first penetrating portion 211a and the second penetrating portion 211b.

In particular, in the present preferred embodiment, there are provided the first through hole 513 and the portion of the second through hole 523 and the two component support portions of the first penetrating portion 211a that is disposed in the space defined by the first through hole 513 and the second penetrating portion 211b that is disposed in the space defined by the second through hole 523. In this manner, since the vehicle component is supported by the plurality of component support portions, the supporting rigidity of the vehicle component is high. Additionally, compared with the case where the vehicle component is supported by a single component support portion, the two component support portions are each small, and therefore, it is easy to avoid interference of the component support portions with the cross portion. Further, making each of the component support portions small makes it easy to avoid interference with the link mechanism.

In the present preferred embodiment, while the two component support portions are described as preferably being aligned with each other in the up-and-down direction of the body frame 21, the number of component support portions and the arrangement thereof are not limited to those described in the preferred embodiments above. Additionally, in the present preferred embodiment, while the single member (the attaching bracket 7) is described as preferably being supported by the two component support portions, different members may be supported individually by the two component support portions.

According to the vehicle of the present preferred embodiment, the hydraulic unit 82 is preferably supported on the body frame 21 via the first penetrating portion 211a and the second penetrating portion 211b that extend toward the front from the body frame 21 and the attaching bracket 7. However, the present invention is not limited to this example. The component support portion that supports the hydraulic unit 82 may be at least either of the vehicle components itself and the attaching bracket that attaches the vehicle component to the body frame 21.

For example, a configuration may be used in which a bolt, for example, is used as a component support portion while a nut is provided on the vehicle component and the body frame, such that the vehicle component is supported on the body frame 21 by fastening the bolt and the nut together. Additionally, the component support portion may include a plurality of components as in the present preferred embodiment or may include a single component.

MODIFIED EXAMPLES

While the present invention has been described heretofore with respect to preferred embodiments thereof, the technical scope of the present invention is not limited to the technical scope that is descriptively defined in the preferred embodiments of the present invention. Those skilled in the art to which the present invention pertains will recognize that various alterations or improvements may be made to the preferred embodiments of the present invention. Referring to FIGS. 7 to 12, additional preferred embodiments of the present invention will be described below.

First Modified Example

In the preferred embodiments described above, the first penetrating portion 211a is described as preferably penetrating the first through hole 513 that includes the turning axis of the upper cross portion 51 and the second penetrating portion 211b penetrates the second through hole 523 that includes the turning axis of the front lower cross portion 52A. However, the present invention is not limited to this example.

Figure 7:
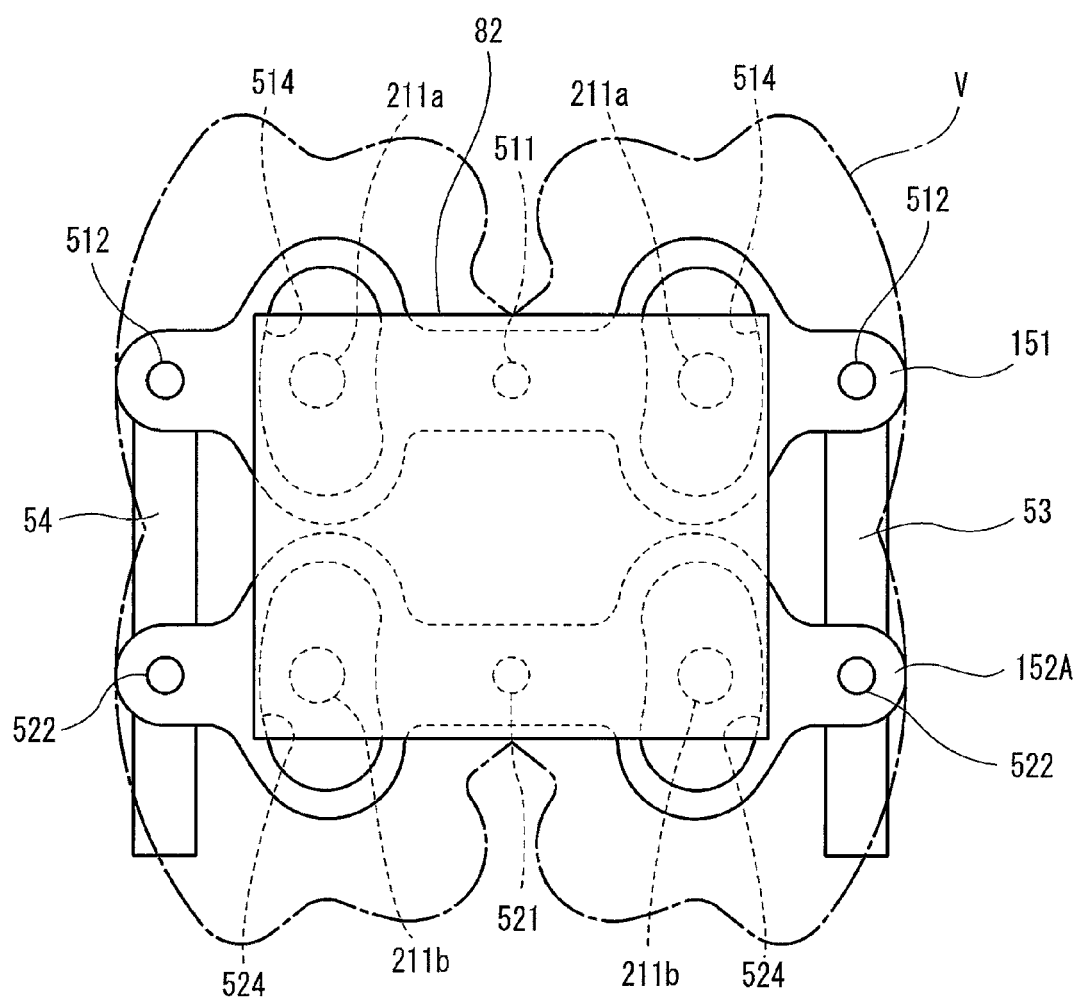
FIG. 7 is a front view showing a link mechanism and a support member of a vehicle according to a first modified example of a preferred embodiment of the present invention.

FIG. 7 is a view showing an upper cross portion 151, a front lower cross portion 152, a left side portion 53, a right side portion 54, and a hydraulic unit 82 that results when these elements are seen from the direction of an upper middle axis M1, and a headstock 211 is omitted from illustration. For example, as in a vehicle according to a modified example shown in FIG. 7, a configuration may be used in which first penetrating portions penetrate positions on the first upper cross section 151 where turning axes of the upper cross portion 151 do not pass and second penetrating portions penetrate positions on the front lower cross portion 152A where turning axes of the front lower cross portion 152A do not pass.

Specifically, as shown in FIG. 7, a through hole 514 is provided in the upper cross portion 151 individually between an upper middle bearing 511 and an upper right bearing 512 and between the upper middle bearing 511 and the upper left bearing 512. The first penetrating portions 211a penetrate the through holes 514. The first through holes 514 are sized so as not to interfere with the first penetrating portions 211a even when a link mechanism 5 operates as the vehicle leans. Both the upper cross portion 151 and the front lower cross portion 152A are located forward of a headstock 211.

As with the upper cross portion 151, a second through hole 524 is provided in the front lower cross portion 152A individually between a lower middle bearing 521 and a lower right bearing 522 and between the lower middle bearing 521 and a lower left bearing 522. The second penetrating portions 211b penetrate the second through holes 524. The second through holes 524 are sized so as not to interfere with the second penetrating portions 211b even when the link mechanism 5 operates as the vehicle leans. By using this configuration, the second penetrating portions 211b penetrate a front movable outer edge V of the link mechanism 5, so that the vehicle component such as the hydraulic unit 82 or the like is supported forward of the link mechanism 5 without enlarging a front portion of the vehicle.

In particular, the link mechanism 5 includes the first through holes 514 that are provided in the front movable outer edges V relative to the body frame 21 of the upper cross portion 151 and the front lower cross portion 152A that are located forward of the body frame 21 as seen from the direction of the upper middle axis M1 and that define spaces that do not overlap the upper cross portion 151 that is located forward of the body frame 21 when the upper cross portion 151 turns relative to the body frame 21.

Additionally, the link mechanism 5 includes the second through holes 524 that are provided in the front movable outer edges V relative to the body frame 21 of the upper cross portion 151 and the front lower cross portion 152A that are located forward of the body frame 21 as seen from the direction of a lower middle axis M4 and that define spaces that do not overlap the front lower cross portion 152A that is located forward of the headstock 211 when the front lower cross portion 152A turns relative to the body frame 21.

The vehicle component is supported on the body frame 21 via the first penetrating portions 211a that are disposed in the spaces defined by the first through holes 514 and the second penetrating portions 211b that are disposed in the spaces defined by the second through holes 524.

Also, in this construction, the first through holes 514 and the second through holes 524 are provided in the upper cross portion 151 and the front lower cross portion 152 which are thick in the up-and-down direction of the body frame 21. The vehicle component is supported on the body frame 21 via the first penetrating portions 211a that are disposed in the spaces defined by the first through holes 514 and the second penetrating portions 211b that are disposed in the spaces defined by the second through holes 524. By using this configuration, it is possible to provide the vehicle 1 that supports the vehicle component forward of the link mechanism 5 in an ensured manner while avoiding interference with the link mechanism 5 without enlarging a front portion of the vehicle.

In this modified example, it is preferable that the through holes 514, 524, which define the spaces where the first penetrating portions 211a and the second penetrating portions 211b are located, are provided in positions that are located closer to the upper middle bearing 511 (or the lower middle bearing 521) than to the left side portion 53 and the right side portion 54 in relation to the left-and-right direction of the body frame 21 when seen from the front of the vehicle. When the first penetrating portions 211a and the second penetrating portions 211b are disposed in positions located close to the upper middle axis M1 and the lower middle axis M4, respectively, the relative displacements between the upper cross portion 151 and the front lower cross portion 152A and between the first penetrating portions 211a and the second penetrating portions 211b are small when the link mechanism 5 operates. This enables the through holes 514, 524 that define the spaces where the first penetrating portions 211a and the second penetrating portions 211b are provided to be small in size. In this manner, even though the sizes of the through holes 514, 524 are small, the contact of the upper cross portion 151 and the front lower cross portion 152A with the first penetrating portions 211a and the second penetrating portions 211b is prevented by providing the through holes 514, 524 in the positions located close to the upper middle axis M1 and the lower middle axis M4, respectively.

In the vehicle according this modified example, the first through holes 514 are preferably elongated holes that include arcs that are centered at the upper middle axis M1 of the upper cross portion 151. The second through holes 524 are preferably elongated holes that include arcs that are centered at the lower middle axis M4 of the front lower cross portion 152A. When the link mechanism 5 operates, the upper cross portion 151 turns about the lower middle axis M1 relative to the body frame 21. The front lower cross portion 152A turns about the lower middle axis M4 relative to the body frame 21. Because of this, when the through holes 514, 524 have shapes described above, the through holes 514, 524 are prevented from being interfering with the first penetrating portions 211a and the second penetrating portions 211b, respectively, thus, making it possible to make the through holes 514, 524 small.

Second Modified Example

Figure 8A:
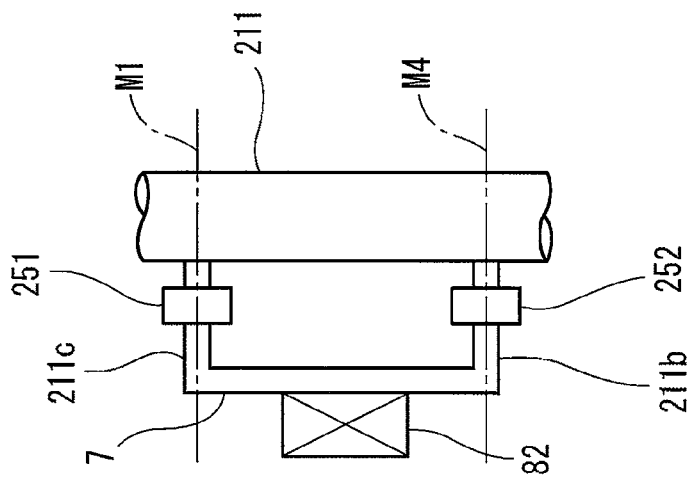
FIGS. 8A to 8C are side sectional views that show a link mechanism and a support member of a vehicle according to a second modified example of a preferred embodiment of the present invention.
Figure 8B:
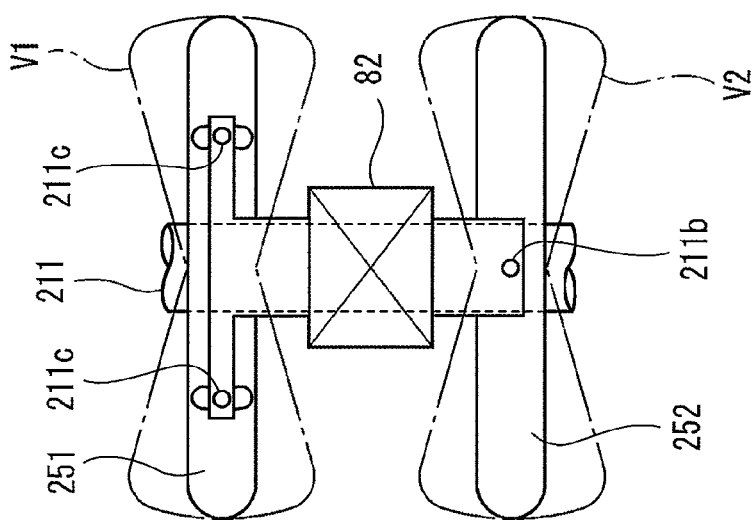
Figure 8C:
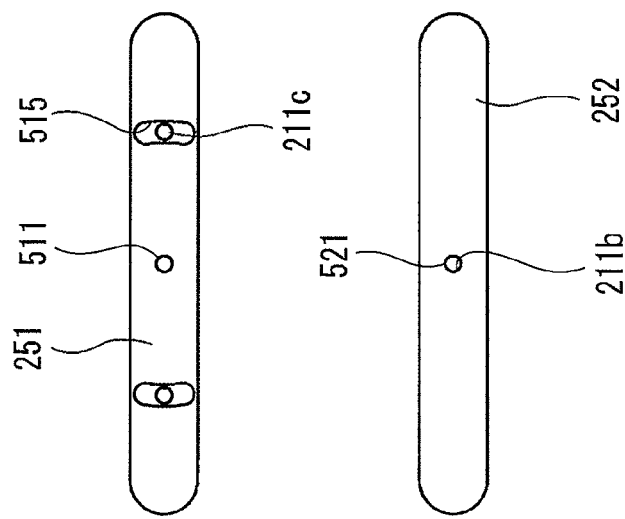

FIGS. 8A to 8C are views depicting a second modified example of a preferred embodiment of the present invention. FIG. 8A is a side view showing a headstock 211, an upper cross portion 251, a lower cross portion 252, an attaching bracket 7, and a hydraulic unit 82 that is an example of a vehicle component of a vehicle according to the second modified example. FIG. 8B is a view that results from viewing FIG. 8A from the direction of an upper middle axis M1. FIG. 8C is a view in which the upper cross portion 251 and the lower cross portion 252 are removed from FIG. 8B.

In this modified example, as shown in FIG. 8A, both the upper cross portion 251 and the lower cross portion 252 are disposed forward of the headstock 211. A relatively wide space is provided between the upper cross portion 251 and the lower cross portion 252 in relation to an up-and-down direction of a body frame 21. A front movable outer edge V1 that is defined by the upper cross portion 251 and a front movable outer edge V2 that is defined by the lower cross portion 252 are independent of each other.

As shown in FIG. 8C, as with the preferred embodiments described above, a second through hole 521 that passes through a lower middle axis M4 is preferably provided in the lower cross portion 252. A second penetrating portion 211b is disposed in a space that is defined by the second through hole 521, and the second penetrating portion 211b supports the attaching bracket 7. This second penetrating portion 211b is provided in the front movable outer edge V2 that is defined by the lower cross portion 252 as seen from the direction of the upper middle axis M1.

Additionally, in this modified example, a third through hole 515 is provided on each side of the upper middle axis M1 in the upper cross portion 251 in relation to a left-and-right direction of the body frame 21. Each of the third through holes 515 is a through portion that defines a space that does not overlap the upper cross portion 251 when the upper cross portion 251 turns relative to the body frame 21. The third through hole 515 is preferably an elongated hole including an arc that is centered at the upper middle axis M1 as seen from the direction of the upper middle axis M1. The third through holes 515 are provided in the front movable outer edge V1 that is defined by the upper cross portion 251 as seen from the direction of the upper middle axis M1. Third penetrating portions 211c are disposed in the spaces defined by the third through holes 515. The third penetrating portions 211c support the attaching bracket 7 on the headstock 211.

Also, in this construction, the second through hole 523 and the third through holes 515 are provided by using the cross portions 251, 252 which are thick in the up-and-down direction of the body frame 21. The vehicle component is supported on the body frame 21 via the second penetrating portion 211b that is disposed in the space that is defined by the second through hole 523 and the third penetrating portions 211c that are disposed in the spaces that are defined by the third through holes 525. By using this configuration, it is possible to provide the vehicle 1 that supports the vehicle component forward of the link mechanism 5 in an ensured manner while avoiding interference with the link mechanism 5 without enlarging a front portion of the vehicle.

Third Modified Example

FIGS. 9A and 9B are views depicting a third modified example of a preferred embodiment of the present invention. FIG. 9A is a side view showing a headstock 211, an upper cross portion 351, a lower cross portion 352, an attaching bracket 7, and a hydraulic unit 82 that is an example of a vehicle component of a vehicle according to the third modified example. FIG. 9B is a view that results from viewing FIG. 9A from the direction of an upper middle axis M1.

In this modified example, as for the upper cross portion 351 and the lower cross portion 352, the upper cross portion 351 is provided forward of the headstock 211, and the lower cross portion 352 is provided behind the headstock 211.

As with the preferred embodiments described above, a first penetrating portion 211a is disposed in a space that is defined by a first through hole 513, and the attaching bracket 7 that supports the vehicle component is supported on the upper cross portion 351 via the first penetrating portion 211a. The first through hole 513 is provided in a front movable outer edge V of the upper cross portion 351 as seen from the direction of an upper middle axis M1.

In this modified example, the attaching bracket 7, where the vehicle component is supported, is supported on a body frame 21 via a connecting portion 211d that is not disposed in the space that is defined by the first through hole 513, but is disposed outward of the front movable outer edge V as seen from the direction of the upper middle axis M1. In particular, the connecting portion 211d is spaced away and downward from the front movable outer edge V of the upper cross portion 351 so as to be provided in a position that is spaced away from the upper cross portion 351 as seen from the direction of the upper middle axis M1.

In this modified example, the attaching bracket 7 is supported strongly and rigidly on the body frame 21 by the first penetrating portion 211a and the connecting portion 211d. Additionally, since the supporting rigidity is ensured by the first penetrating portion 211a provided in the front movable outer edge V as seen from the upper middle axis M1 to be disposed in the space that is defined by the first through hole 513, even though the connecting portion 211d is provided which is disposed outward of the front movable outer edge V as seen from the direction of the upper middle axis M1, it is difficult to enlarge the supporting construction of the vehicle component.

Fourth Modified Example

Figure 10A:
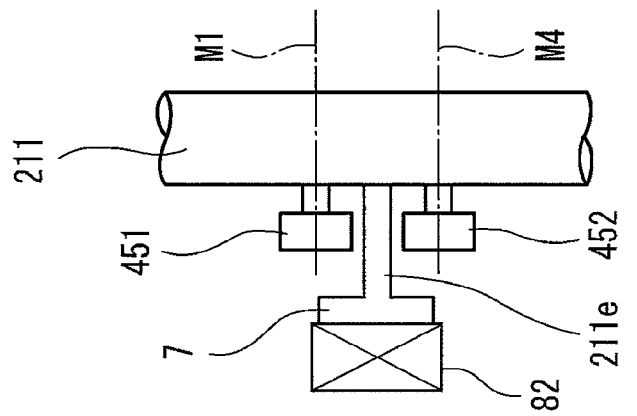
FIGS. 10A to 10C are views of a link mechanism and a component support portion of a vehicle according to a fourth modified example of a preferred embodiment of the present invention.
Figure 10B:
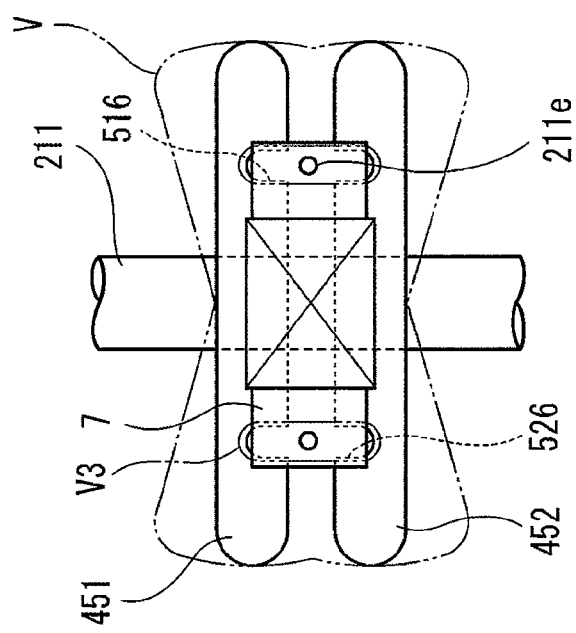
Figure 10C:
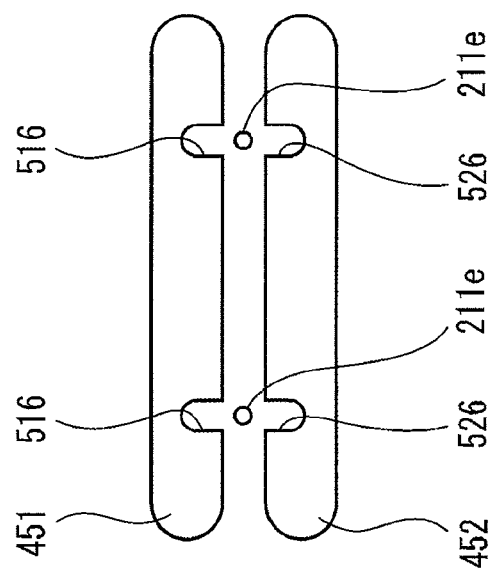

FIGS. 10A to 10C are views depicting a fourth modified example of a preferred embodiment of the present invention.

FIG. 10A is a side view showing a headstock 211, an upper cross portion 451, a lower cross portion 452, an attaching bracket 7, and a hydraulic unit 82 that is an example of a vehicle component of a vehicle according to the fourth modified example. FIG. 10B is a view that results from viewing FIG. 10A from the direction of an upper middle axis M1. FIG. 10C is a view in which the upper cross portion 451 and the lower cross portion 452 are removed from FIG. 10B.

In this modified example, both the upper cross portion 451 and the lower cross portion 452 are disposed forward of the headstock 211.

In this modified example, both the upper cross portion 451 and the lower cross portion 452 are provided forward of the headstock 211. The upper cross portion 451 and the lower cross portion 452 are disposed close to each other in relation to a up-and-down direction of a body frame 21, and therefore, the upper cross portion 451 and the lower cross portion 452 define a front movable outer edge V that is a continuous combination of movable outer edges of the upper and lower cross portions.

Two through portions 516 are provided in a lower surface of the upper cross portion 451 so as to be depressed upwards in the up-and-down direction of the body frame 21. The two through portions 516 are provided individually at a left portion and a right portion of the lower surface of the upper cross portion 451 in relation to the left-and-right direction of the body frame 21. Spaces defined by the through portions 516 penetrate the upper cross portion 451 in the direction of the upper middle axis M1.

Two through portions 526 are provided in an upper surface of the lower cross portion 452 so as to be depressed downwards in the up-and-down direction of the body frame 21. The two through portions 526 are provided individually at a left portion and a right portion of the lower surface of the lower cross portion 452 in relation to the left-and-right direction of the body frame 21. Spaces defined by the through portions 526 penetrate the lower cross portion 452 in the direction of a lower middle axis M4. The through portions 526 in the lower cross portion 452 are preferably provided in the same or substantially the same positions as the positions of the through portions 516 in the upper cross portion 451 in relation to the left-and-right direction of the body frame 21 as seen from the direction of the lower middle axis M4.

As shown FIG. 10B, as seen from the direction of the upper middle axis M1, the through portions 516, 526 are provided in the front movable outer edge V that is defined by the upper cross portion 451 and the lower cross portion 452. The through portions 516, 526 define a space V3 that does not overlap the upper cross portion 451 and the lower cross portion 452 that are located in front of the headstock 211 when the upper cross portion 451 and the lower cross portion 452 turn relative to the body frame 21.

The attaching bracket 7 that supports the hydraulic unit 82 is supported on the body frame 21 via fourth penetrating portions 211e that are disposed in the space V3 that is defined by the through portions 516, 526.

In this modified example, since the vehicle component is supported on the body frame 21 by the fourth penetrating portions 211e provided in the front movable outer edge V and are disposed in the space V3 that is defined by the through portions 516, 526 as seen from the direction of the upper middle axis M1, the supporting construction of the vehicle component is difficult to be enlarged.

According to the vehicle of this modified example, a link mechanism 5 includes the upper cross portion 451 (an example of a front upper cross portion) located forward of the headstock 211 and the lower cross portion 452 (an example of a front lower cross portion) located forward of the headstock 211, and the lower middle axis M4 is located below the upper cross portion 451.

The through portions 516, 526 include the through portions 516 (an example of an upper through portion) that define a portion of a lower edge of the upper cross portion 451 and the through portions 526 (an example of a lower through portion) that define a portion of an upper edge of the lower cross portion 452.

According to the vehicle of this modified example, it is possible to provide the fourth penetrating portions 211e by making use of the space between the upper cross portion 451 and the lower cross portion 452. This makes it difficult for the supporting construction of the vehicle component to be enlarged.

Fifth Modified Example

Figure 11:
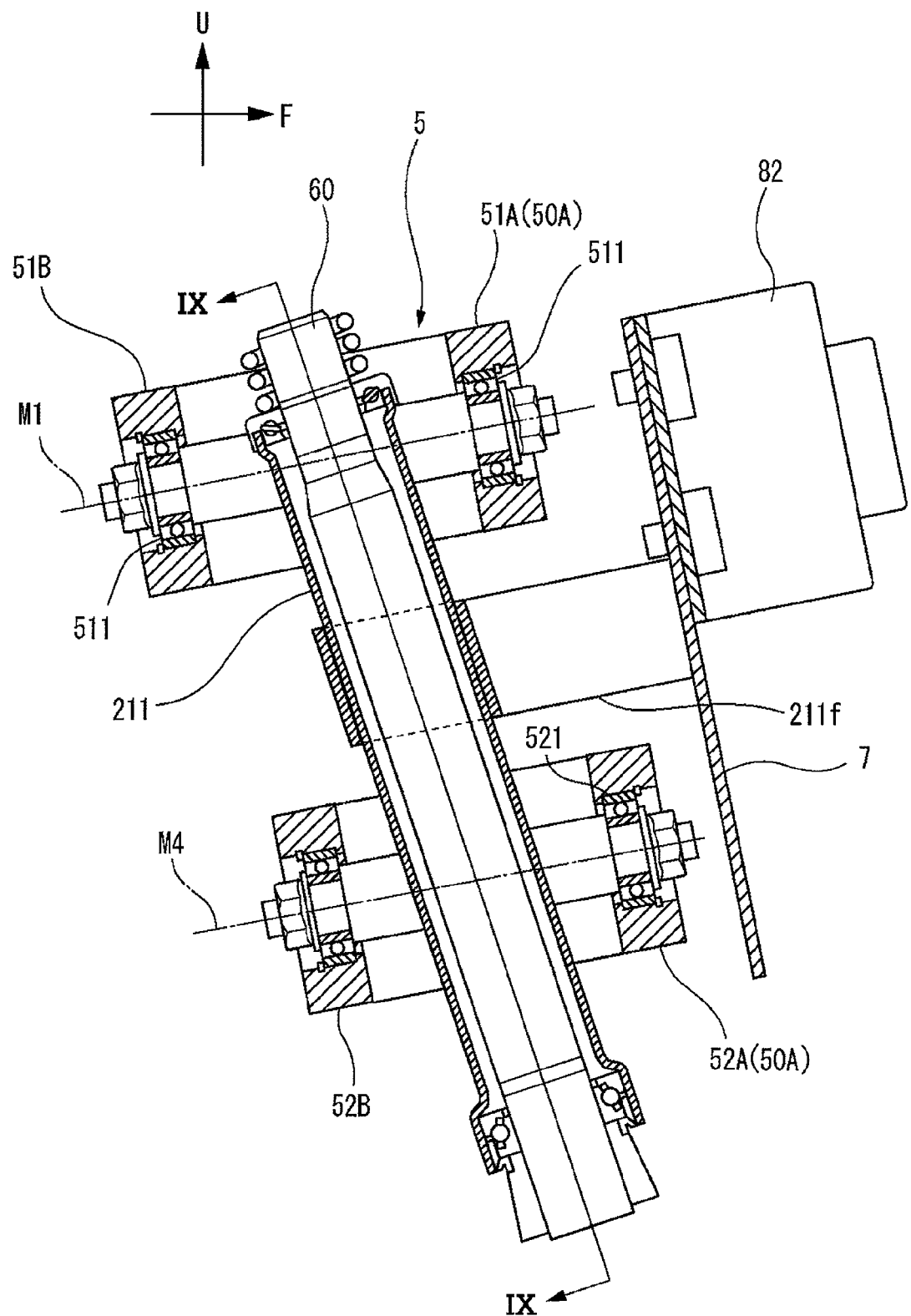
FIG. 11 is a view showing a link mechanism and a component support portion of a vehicle according to a fifth modified example of a preferred embodiment of the present invention.
Figure 12:
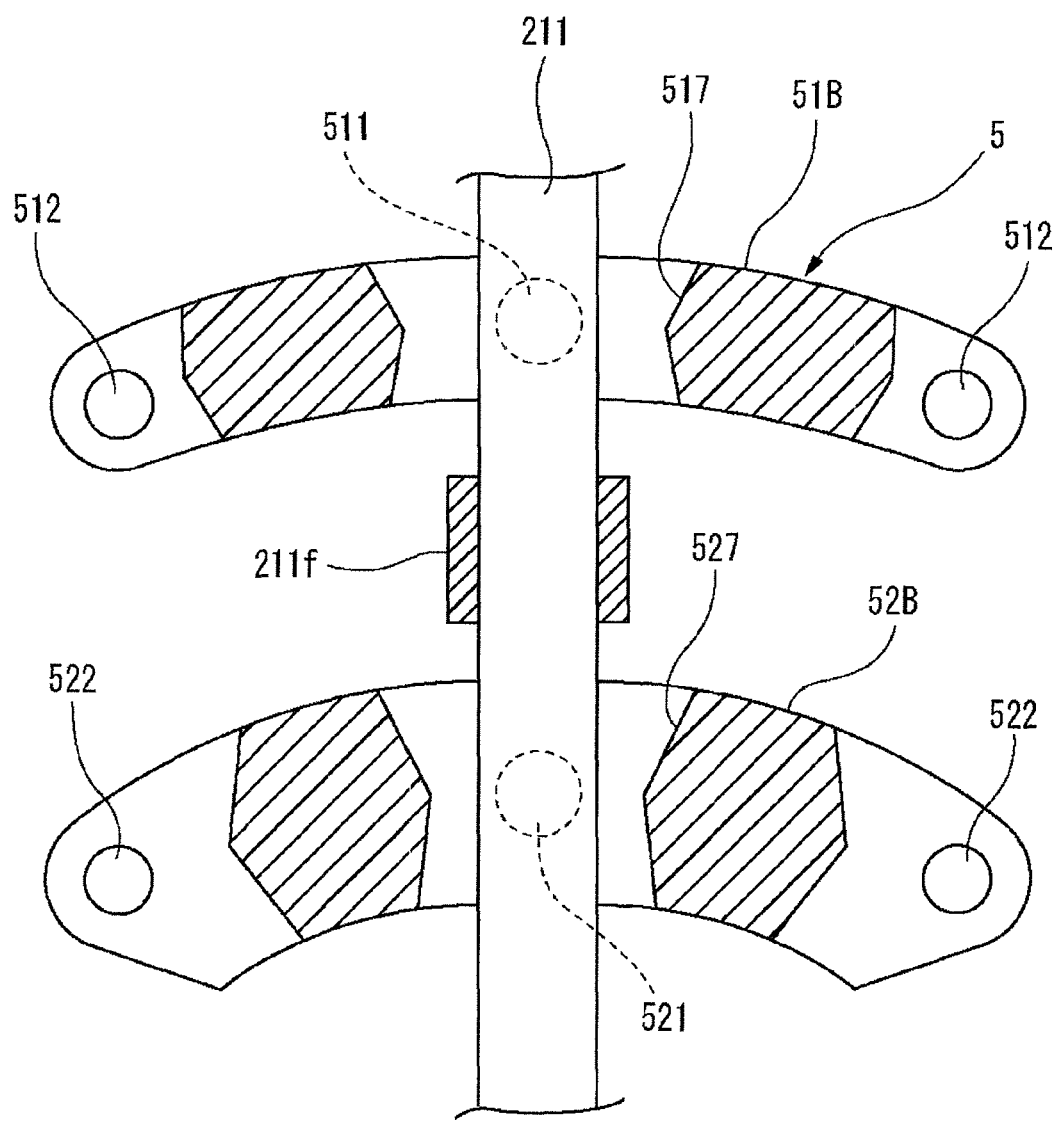
FIG. 12 is a view showing a link mechanism and a component support portion of a vehicle according to a fifth modified example of a preferred embodiment of the present invention.
Figure 13:
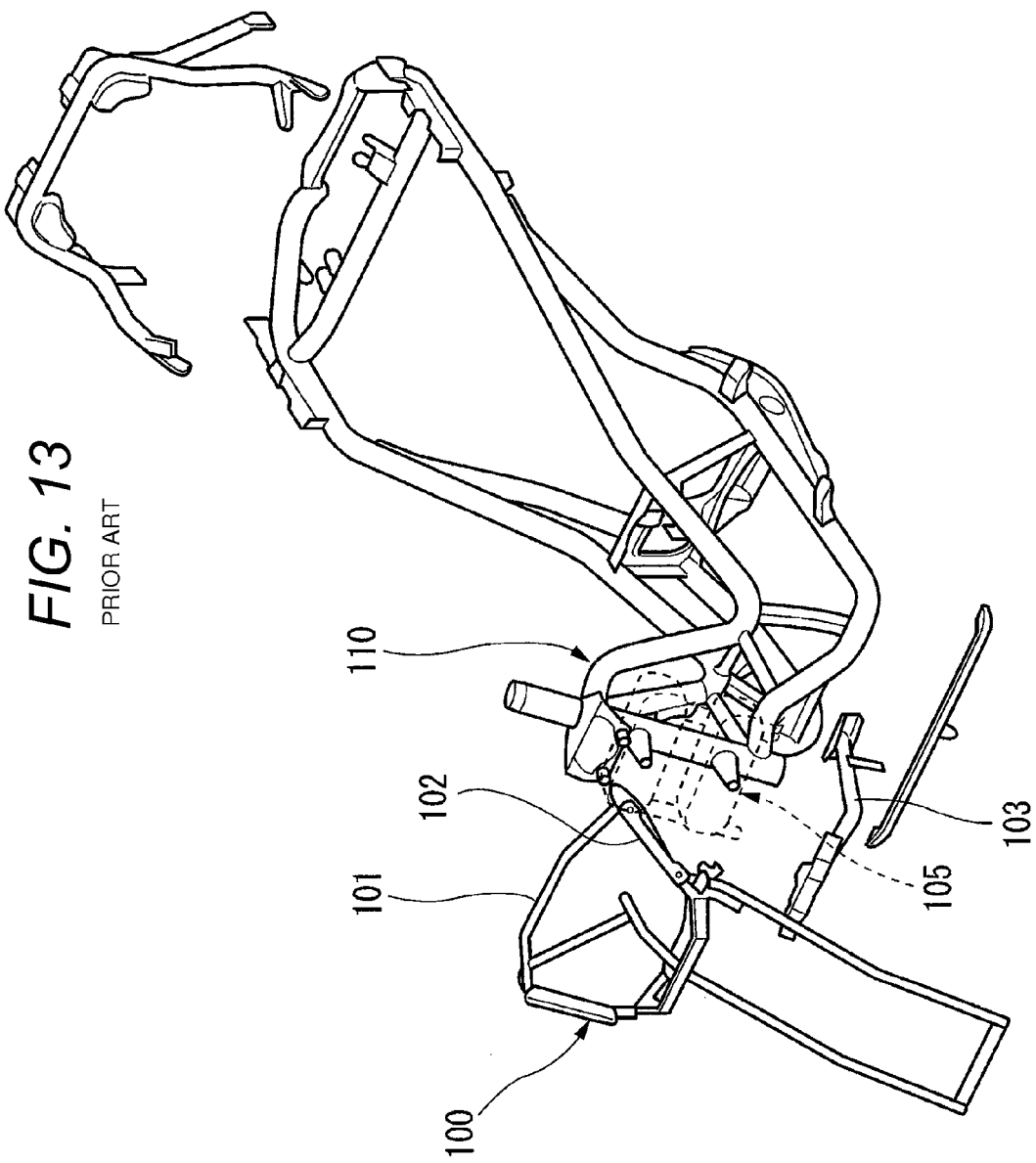
FIG. 13 is a perspective view showing a body frame of a vehicle according to Catalogo partidi ricambio, MP3 300 64102 ie LT Mod. ZAPM64102, Piaggio.

FIG. 11 is a side sectional view including a link mechanism 5 of a vehicle 1 according to a fifth modified example of a preferred embodiment of the present invention. FIG. 12 is a sectional view taken along the line IX-IX in FIG. 11 that results when FIG. 11 is seen from the direction of an upper middle axis M1.

In this modified example, the link mechanism 5 includes an upper cross portion and a lower cross portion. The upper cross portion includes a front upper cross portion 51A and a rear upper cross portion 51B. The lower cross portion includes a front lower portion 52A and a rear lower cross portion 52B. A front cross portion 50A that includes the front upper cross portion 51A and the front lower cross portion 52A is located forward of a headstock 211. The front upper cross portion 51A and the front lower cross portion 52A define a front movable outer edge V that is a continuous combination of movable outer edges defined by the front upper and lower cross portions.

In the preferred embodiments described above, the first penetrating portion 211a and the second penetrating portion 211b are described as preferably penetrating individually the upper cross portion 51 and the lower cross portion 52. However, the present invention is not limited thereto. For example, as shown in FIG. 11, a configuration may be used in which a fifth penetrating portion 211f penetrates a space between the front upper cross portion 51A and the front lower cross portion 52A. For example, as shown in FIG. 11, a configuration may be used in which the fifth penetrating portion 211f is located below the front upper cross portion 51A and above the front lower cross portion 52A.

As shown in FIG. 12, space forming portions 517, 527 (an example of a through portion) are provided individually in the rear upper cross portion 51B and the rear lower cross portion 52B. Although not shown, the space forming portions 517 are configured so as to extend in a front-and-rear direction from the front upper cross portion 51A to the rear upper cross portion 51B. The space forming portions 527 are configured so as to extend in the front-and-rear direction from the front lower cross portion 52A to the rear lower cross portion 52B. The space forming portions 517 prevent the front upper cross portion 51A and the rear upper cross portion 51B from moving relative to the headstock 211 when the link mechanism 5 operates. The space forming portions 527 prevent the front lower cross portion 52A and the rear lower cross portion 52B from moving relative to the headstock 211 when the link mechanism 5 operates. The space forming portions 517, 527 prevent the front upper cross portion 51A and the front lower cross portion 52A from moving when the link mechanism 5 operates to provide a space between the front upper cross portion 51A and the front lower cross portion 52A.

When the link mechanism 5 operates in a predetermined amount, the space forming portions 517 are brought into contact with the headstock 211 to prevent the relative movement of the front upper cross portion 51A and the rear upper cross portion 51B to the headstock 211. Similarly, when the link mechanism 5 operates in a predetermined amount, the space forming portions 527 are brought into contact with the headstock 211 to prevent the relative movement of the front lower cross portion 52A and the rear lower cross portion 52B to the headstock 211. By doing so, when the link mechanism 5 is operated in a predetermined amount, the reduction in extent of the space between the front upper cross portion 51A and the front lower cross portion 52A is prevented, and the reduction in extent of the space between the rear upper cross portion 51B and the rear lower cross portion 52B is prevented. By doing so, the fifth through portion 211*f* is prevented from being brought into contact with the front upper cross portion 51A and the front lower cross portion 52A. In this manner, the space forming portions 517, 527 provide a space so that the front upper cross portion 51A and the front lower cross portion 52A are prevented from being brought into contact with the fifth penetrating portion 211.

In particular, the space forming portions 517, 527 provide a space that does not overlap the front cross portion 50A when the front cross portion 50A turns relative to the body frame 21 and that is inward of a front movable outer edge V that defines an outer edge of a locus defined by the front cross portion 50A turning relative to the body frame 21 as seen from the direction of middle axes M1, M4. The vehicle component such as the hydraulic unit 82 is supported on the body frame 21 via the fifth penetrating portion 211*f* (an example of a component support portion) that is disposed within the space defined by the space forming portions 517, 527. The fifth penetrating portion 211*f* penetrates below a movable outer edge of the front upper cross portion 51A and above a movable outer edge of the front lower cross portion 52A as seen from the direction of the middle axes M1, M4. The fifth penetrating portion 211*f* penetrates a space that is defined by a locus defined by a lower edge of the front upper cross portion 51A when the front upper cross portion 51A turns relative to the body frame 21 and a locus that is defined by an upper edge of the front lower cross portion 52A when the front lower cross portion 52A turns relative to the body frame 21 as seen from the direction of the middle axes M1, M4. The fifth penetrating portion 211*f* penetrates the front movable outer edge V that is defined by a continuous combination of respective movable outer edges of the front upper cross portion 51A and the front lower cross portion 52A as seen from the direction of the middle axes M1, M4.

This configuration also enables the vehicle component to be supported in front of the link mechanism 5 without enlarging a front portion of the vehicle by causing the fifth penetrating portion 211*f* to penetrate inside the front movable outer edge V relative to the body frame 21 of the front cross portion 50A.

It is noted that the space forming portions 517, 527 should provide a space that does not overlap the front cross portion 50A when the front cross portion 50A turns relative to the body frame 21 and that is inward of the front movable outer edge V that is defined by the front upper cross portion 51A and the front lower cross portion 52A, and hence, the present invention is not limited to what is described in this modified example. For example, the space forming portions 527 may be provided in the lower cross portion that includes the front lower cross portion 52A and the rear lower cross portion 52B other than the front lower cross portion 52A and the rear lower cross portion 52B. Alternatively, the space forming portions may be provided on either the front cross portion or the lower cross portion and do not have to be provided on the other.

However, as shown in FIGS. 11 and 12, when attempting to cause the fifth penetrating portion 211*f* to penetrate the space between the upper cross portion and the lower cross portion, a dimension in the up-and-down direction of the link mechanism 5 tends to be increased so as to ensure the space. In contrast to this, in the preferred embodiments shown in FIGS. 1 to 6, the first through hole 513 and the second through hole 523 include the turning centers or axes that do not move even though the link mechanism 5 operates. It is preferable that the first penetrating portion 211*a* and the second penetrating portion 211*b* penetrate the first through hole 513 and the second through hole 523, respectively. Since the through holes 513, 523 do not move even though the link mechanism 5 operates, the through holes 513, 523 that are provided in the link mechanism 5 are the smallest through holes that allow the penetration of the first penetrating portion 211*a* and the second penetrating portion 211*b*.

When referred to in this description, "parallel or substantially parallel" also includes two straight lines that do not intersect each other as members while they are inclined within the range of about ±40 degrees, for example. When used together with a "direction" and a "member" in the present invention, "along" also includes a case where what follows the direction and the member is inclined relative thereto within the range of about ±40 degrees, for example. When used together with a "direction" in the present invention, "extend" also includes a case where what extends is inclined relative to the direction within the range of about ±40 degrees, for example.

The vehicle according to preferred embodiments of the present invention is a vehicle that includes a body frame that can lean and two front wheels. The number of rear wheels is not limited to one, and hence, may be two. The vehicle may include a body cover that covers the body frame. The vehicle may not include the body cover which covers the body frame. The power unit includes the power source. The power source is not limited to the engine and hence may be an electric motor.

In the preferred embodiments and the modified examples described above, the right side portion 53, the left side portion 54, and the headstock 211 (the link support portion) are preferably provided in positions that are superposed one on another when the body frame 21 is seen from a side thereof. However, when the body frame 21 is seen from the side thereof, the headstock 211 may be provided in a different position from the positions where the right side portion 53 and the left side portion 54 are provided in relation to the front-and-rear direction. Additionally, angles at which the right side portion 53 and the left side portion 54 are inclined relative to the up-and-down direction of the body frame 21 may differ from an angle at which the headstock 211 is inclined.

The link support portion (the headstock) may include a single portion or a plurality of portions. When the link support portion includes a plurality of portions, the portions may be joined together through welding, bonding or the like. Alternatively, the portions may be joined together with fastening members such as bolts, rivets or the like.

The upper cross portion may include an upper front cross portion that includes a single portion, an upper rear cross portion that includes a single portion, and a connecting member that is provided between the upper and lower cross portions and that includes a plurality of portions. When the link support portion includes a plurality of portions, the portions may be joined together through welding, bonding or the like. Alternatively, the portions may be joined together with fastening members such as bolts, rivets or the like.

The lower cross portion may include a lower front cross portion that includes a single portion, a lower rear cross portion that includes a single portion, and a connecting member that is provided between the lower front and rear cross portions and that includes a plurality of portions. When the link support portion includes a plurality of portions, the portions may be joined together through welding, bonding or the like. Alternatively, the portions may be joined together with fastening members such as bolts, rivets or the like.

The right side portion and the left side portion may each include a single portion or a plurality of portions. When the link support portion includes a plurality of portions, the portions may be joined together through welding, bonding or the like. Alternatively, the portions may be joined together with fastening members such as bolts, rivets or the like. The right side portion and the left side portion may each include a portion that is disposed forward of the upper cross portion or the lower cross portion in the front-and-rear direction of the vehicle body frame and a portion that is disposed behind the upper cross portion or the lower cross portion in the front-and-rear direction of the vehicle body frame. The upper cross portion or the lower cross portion may be disposed between the portions that are disposed at the front of the right side portion and the left side portion and the portions that are disposed at the rear of the right side portion and the left side portion.

In a preferred embodiment of the present invention, the body frame includes the link support portion, the connecting member (the upper front and rear frame portions), the down frame (the upper and lower frame portions) and the under frame (the lower front and rear frame portions), and these constituent elements are preferably connected together through welding, for example. However, the body frame of the present invention is not limited to the preferred embodiments described above. The body frame preferably includes the link support portion, the upper front and rear frame portions, the upper and lower frame portions, and the lower front and rear frame portions. For example, the body frame may be integral wholly or partially through casting. Additionally, in the body frame, the upper front and rear frame portions and the upper and lower frame portions may include a single member or may include a plurality of separate members.

In a preferred embodiment of the present invention, an acute angle defined by the turning axis SA of the steering shaft and the up-and-down direction of the body frame preferably coincides with an acute angle defined by the direction in which the right shock absorber and the left shock absorber extend or contract and the up-and-down direction of the body frame. However, the present invention is not limited to the preferred embodiments described above. For example, the acute angle defined by the turning axis SA of the steering shaft and the up-and-down direction of the body frame may be smaller or larger than the acute angle defined by the direction in which the right shock absorber and the left shock absorber extend or contract and the up-and-down direction of the body frame.

In addition, in a preferred embodiment of the present invention, the turning axis of the steering shaft and the direction in which the right shock absorber and the left shock absorber extend or contact preferably coincide with each other. However, the present invention is not limited to the preferred embodiments described above. In a side view of the vehicle resting in the upright state, the turning axis of the steering shaft and the direction in which the right shock absorber and the left shock absorber extend or contact may be spaced away from each other in the front-and-rear direction. Additionally, for example, the turning axis of the steering shaft and the direction in which the right shock absorber and the left shock absorber extend or contact may intersect each other.

In a preferred embodiment of the present invention, the right front wheel and the left front wheel are preferably supported so that their upper ends move farther upwards than an upper end of the down frame of the body frame. However, the present invention is not limited to the preferred embodiments described above. In the present invention, the right front wheel and the left front wheel may be supported so that their upper ends move upwards as high as or to a height that is lower than the upper end of the down frame of the body frame in the up-and-down direction of the body frame.

In a preferred embodiment of the present invention, the link mechanism may further include a cross portion in addition to the upper cross portion and the lower cross portion. The upper cross portion and the lower cross portion are so called only by their relative positional relationship in the up-and-down direction. The upper cross portion does not imply an uppermost cross portion in the link mechanism. The upper cross portion indicates a cross portion that is located above a cross portion that is located therebelow. The lower cross portion does not imply a lowermost cross portion in the link mechanism. The lower cross portion indicates a cross portion that is located below a cross portion that is located thereabove. Additionally, the cross portion may include two portions of a right cross portion and a left cross portion. In this manner, the upper cross portion and the lower cross portion may each include a plurality of portions as long as they still provide a link function. Further, other cross portions may be provided between the upper cross portion and the lower cross portion. The link mechanism should include the upper cross portion and the lower cross portion.

In the preferred embodiments and the modified examples described above, the vehicle components are described as including the headlamp 81, the hydraulic unit 82, the windshield 222, the front cover 221 and the like. However, the vehicle components are not limited thereto. For example, the vehicle components may include a horn, turn signals, a radiator, a battery, an anti-theft device, a brake hose, a fastening device for the brake hose, body covers other than the windshield and the front cover, various meters, and the like.

The shape of the attaching bracket 7 that attaches the vehicle component to the penetrating portions is not limited to the shape described in the preferred embodiments. Additionally, the vehicle component may be fixed directly to the first penetrating portion 211*a* and the second penetrating portion 211*b* or the third penetrating portions 211*c* without interposing the attaching bracket therebetween.

Additionally, in the preferred embodiments described above, the vehicle component is preferably disposed as high as the link mechanism 5 in relation to the up-and-down direction of the body frame 21 and in front of the link mechanism 5. However, the present invention is not limited thereto. A vehicle component that is disposed slightly higher or lower than the link mechanism and in front of the link mechanism 5 may be supported on the penetrating portions that penetrate the link mechanism 5.

Further, in the preferred embodiments and the modified examples described above, the penetrating portion is preferably a member that protrudes toward the front from the headstock 211. However, the present invention is not limited thereto. For example, the penetrating portion may be provided so that the penetrating portion protrudes toward the front from a member of the body frame 21 other than the headstock that is located behind the link mechanism 5 to penetrate the link mechanism 5.

A preferred embodiment of the present invention may be configured such that the component support portion that supports the vehicle component is provided entirely in the space that is defined by the through portions. Additionally, a portion of the component support portion is provided in the through portion and the remainder of the component support portion may be provided not in the through portion but outward of the front movable outer edge of the front cross portion. At least a portion of the component support portion should be provided in the through portion.

The present invention is embodied in many different forms. The disclosure herein should be regarded as providing the preferred embodiments of the principle of the present invention. Based on the understanding that the preferred embodiments that are described and/or illustrated herein are not intended to limit the present invention thereto, several preferred embodiments are described and illustrated herein.

Several illustrated preferred embodiments of the present invention are described herein. The present invention is not limited to the various preferred embodiments that are described herein. The present invention can include every preferred embodiment that includes equivalent elements, modifications, deletions, combinations (for example, combinations of the characteristics of the various preferred embodiments), improvements and/or alterations that those skilled in the art to which the present invention pertains can think of. Matters limited by claims should be construed widely based on terms that are used in the claims and should not be limited to the preferred embodiments described in this description or the prosecution of this patent application. Those preferred embodiments should be construed as non-exclusive. For example, in this disclosure, such terms as "preferred," "preferable" and "good" are non-exclusive terms and indicate that "it is preferred but does not limit the invention thereto," "it is preferable but does not limit the invention thereto" and "it is good but does not limit the invention thereto," respectively.

This patent application claims priority to Japanese Patent Application No. 2012-278878 filed on Dec. 21, 2012, Japanese Patent Application No. 2012-278879 filed on Dec. 21, 2012, and Japanese Patent Application No. 2013-138481 filed on Jul. 1, 2013, the entire contents of which are incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A vehicle comprising:
a body frame;
a left front wheel and a right front wheel that are disposed laterally when seen from a front of the vehicle and are configured to be steered;
a left shock absorbing device that supports the left front wheel at a lower portion thereof and configured to absorb an upward displacement of the left front wheel in an up-and-down direction of the body frame;
a right shock absorbing device that supports the right front wheel at a lower portion thereof and configured to absorb an upward displacement of the right front wheel in the up-and-down direction of the body frame;
a link mechanism including:
a right side portion that supports an upper portion of the right shock absorbing device so as to turn about a right steering axis that extends in the up-and-down direction of the body frame;
a left side portion that supports an upper portion of the left shock absorbing device so as to turn about a left turning axis parallel or substantially parallel to the right steering axis; and
a cross portion that supports the right side portion at a right end portion thereof so as to turn about a right axis that extends in a front-and-rear direction of the body frame, that supports the left side portion at a left end portion thereof so as to turn about a left axis parallel or substantially parallel to the right axis, and that is supported on a link support portion of the body frame at a middle portion thereof so as to turn about a middle axis parallel or substantially parallel to the right axis and the left axis; and
a vehicle component disposed forward of the body frame in relation to the front-and-rear direction of the body frame; wherein
the cross portion includes a front cross portion located forward of the link support portion of the body frame;
the link mechanism includes a through hole that extends through the front cross portion when the cross portion turns relative to the body frame;
when viewed in a direction along which the middle axis extends, the through hole is located inward of a front movable outer edge defined by a locus when the cross portion turns relative to the body frame; and
the vehicle component is supported on the body frame via a component support portion disposed within the through hole.

2. The vehicle according to claim 1, wherein the link mechanism includes a front upper cross portion located forward of the link support portion and a front lower cross portion located forward of the link support portion, and the middle axis is located below the upper cross portion; and
the through hole includes an upper through hole that extends through a portion of a lower edge of the front upper cross portion and a lower through hole that extends through a portion of an upper edge of the front lower cross portion.

3. The vehicle according to claim 1, wherein the vehicle component is supported at the link support portion of the body frame.

4. The vehicle according to claim 1, further comprising a plurality of through holes including the through hole and a plurality of component support portions including the component support portion.

5. The vehicle according to claim 1, wherein the vehicle component is supported on the body frame via a connecting portion that is not disposed in the through hole, but is disposed outward of the front movable outer edge.

6. The vehicle according to claim 1, wherein the vehicle support portion defines a portion of at least any one of the body frame, the vehicle component, and an attaching bracket with which the vehicle component is attached to the body frame.

7. The vehicle according to claim 1, wherein the cross portion includes a rear cross portion located rearward of the link support portion of the body frame.

8. The vehicle according to claim 1, wherein the through hole is located inward of the front movable outer edge of the front cross portion when viewed in the direction along which the middle axis extends.

9. The vehicle according to claim 8, wherein the through hole is located closer to the middle axis than a left end portion and a right end portion of the front cross portion.

10. The vehicle according to claim 8, wherein the middle axis is located within the through hole when viewed in the direction along which the middle axis extends.

11. The vehicle according to claim 8, wherein the component support portion defines a portion of a turning support portion that turnably supports the front cross portion on the link support portion.

12. The vehicle according to claim 8, wherein the through hole defines an elongated hole that includes an arc centered at the middle axis of the front cross portion.

* * * * *